US009998732B2

(12) United States Patent
Yamakawa

(10) Patent No.: US 9,998,732 B2
(45) Date of Patent: Jun. 12, 2018

(54) DISPLAY APPARATUS AND DISPLAY SYSTEM

(71) Applicant: Sakai Display Products Corporation, Sakai-shi, Osaka (JP)

(72) Inventor: Ryo Yamakawa, Sakai (JP)

(73) Assignee: SAKAI DISPLAY PRODUCTS CORPORATION, Osaka (JP)

( * ) Notice: Subject to any disclaimer, the term of this patent is extended or adjusted under 35 U.S.C. 154(b) by 0 days. days.

(21) Appl. No.: 14/772,297

(22) PCT Filed: Apr. 23, 2014

(86) PCT No.: PCT/JP2014/061484
§ 371 (c)(1),
(2) Date: Sep. 2, 2015

(87) PCT Pub. No.: WO2014/181690
PCT Pub. Date: Nov. 13, 2014

(65) Prior Publication Data
US 2016/0007010 A1    Jan. 7, 2016

(30) Foreign Application Priority Data

May 8, 2013 (JP) .................................. 2013-098709

(51) Int. Cl.
*H04N 13/04* (2006.01)
*G09G 3/20* (2006.01)
(Continued)

(52) U.S. Cl.
CPC ............. *H04N 13/044* (2013.01); *G02B 6/00* (2013.01); *G02B 27/017* (2013.01); *G09G 3/20* (2013.01); *G09G 3/34* (2013.01); *G09G 3/342* (2013.01); *G09G 3/36* (2013.01); *H04N 13/0438* (2013.01); *G02B 27/26* (2013.01);
(Continued)

(58) Field of Classification Search
CPC ............. H04N 13/0438; H04N 13/044; H04N 2213/008; G02B 27/017; G02B 27/26; G02B 2027/0178; G02B 2027/0118; G02B 2027/014; G09G 3/342; G09G 3/20;
(Continued)

(56) References Cited

U.S. PATENT DOCUMENTS

| 2011/0164003 A1* | 7/2011 | Kobayashi ........... G09G 3/3644 345/204 |
| 2012/0320056 A1* | 12/2012 | Ahn .................... H04N 13/0438 345/426 |
| 2014/0002509 A1* | 1/2014 | Kim ....................... G09G 3/003 345/690 |

FOREIGN PATENT DOCUMENTS

JP    2010-276928 A    12/2010

* cited by examiner

*Primary Examiner* — Christopher E Leiby
(74) *Attorney, Agent, or Firm* — Bozicevic, Field & Francis LLP; Rudy J. Ng; Bret E. Field

(57) ABSTRACT

A display apparatus includes a liquid crystal panel, and a plurality of light sources irradiating the liquid crystal panel with light. The display apparatus respectively displays signals corresponding to the respective regions in an image frame, in respective regions of the liquid crystal panel irradiated with light by each of the light sources, in an order from both end sides in an arrangement direction thereof toward a center alternately with each other, respectively. The display apparatus irradiates the respective regions with light by the light sources corresponding thereto, in a latter period within a period in which the signals are displayed in the respective regions of the liquid crystal panel.

10 Claims, 13 Drawing Sheets

(51) Int. Cl.
*G09G 3/34* (2006.01)
*G09G 3/36* (2006.01)
*G02B 6/00* (2006.01)
*G02B 27/01* (2006.01)
G09G 3/00 (2006.01)
G02B 27/26 (2006.01)

(52) U.S. Cl.
CPC .................. *G02B 2027/014* (2013.01); *G02B 2027/0118* (2013.01); *G02B 2027/0178* (2013.01); *G09G 3/003* (2013.01); *G09G 2310/024* (2013.01); *H04N 2213/008* (2013.01)

(58) Field of Classification Search
CPC ............ G09G 3/34; G09G 3/36; G09G 3/003; G09G 2310/024
See application file for complete search history.

F I G. 5
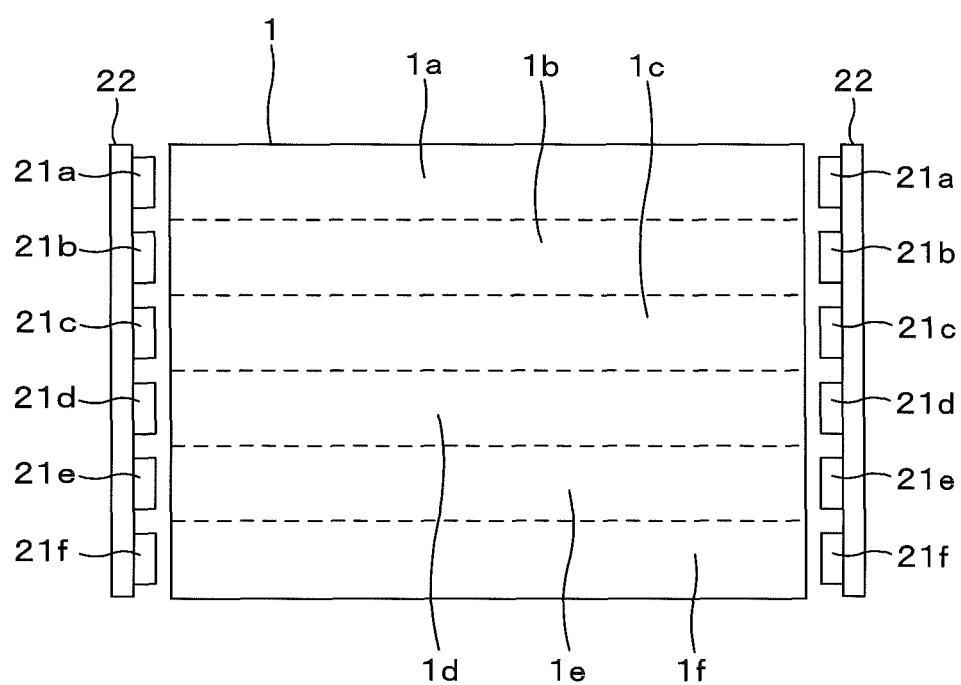

DISPLAY APPARATUS AND DISPLAY SYSTEM

CROSS-REFERENCE TO RELATED APPLICATION

This application is the national phase under 35 U.S.C. § 371 of PCT International Application No. PCT/JP2014/061484 which has an International filing date of Apr. 23, 2014 and designated the United States of America.

BACKGROUND

1. Technical Field

The present invention relates to a display apparatus including a liquid crystal panel which displays an image and a plurality of light sources which irradiate the liquid crystal panel with light, and a display system.

2. Description of Related Art

Recently, the development of a liquid crystal display (LCD) having a three-dimensional (3D) display function for displaying a 3D image has been progressed. The 3D display function employs, for example, a frame sequential system using a liquid crystal shutter glasses (hereinafter, referred to as a glasses). The frame sequential system alternately displays an image for right eye (hereinafter, referred to as a right-eye image) and an image for left eye (hereinafter, referred to as a left-eye image) on a liquid crystal display in a time division manner, and blocks a sight of the left eye by the glasses during displaying the right-eye image, while blocking a sight of the right eye by the glasses during displaying the left-eye image. By repeating these display processing of the image and blocking processing by the glasses, the left and right eyes of a viewing user (viewer) may view the image different from each other, and due to a difference (parallax) between the right-eye image and the left-eye image, the user can perceive the image to be a stereoscopic image.

In the liquid crystal display employing the frame sequential system, it is important to suppress an occurrence of a phenomenon (a so-called crosstalk) that the right-eye image enters into the sight of the left eye, or the left-eye image enters into the sight of the right eye, in terms of improving display performance. As an effective technique for suppressing the occurrence of crosstalk, a backlight scanning technique, in which a backlight (light source) is divided into a plurality of regions and the backlight is turned on for each region, has been known in the art. By using the backlight scanning technique, when the backlight is turned on only in a latter period in which a response of the liquid crystal display element has been subsided within a period of displaying one image frame (within one frame period), it is possible to prevent an image of the next image frame (for example, left-eye image) from being entered into the image of the previous image frame (for example, right-eye image).

Hereinafter, processing of controlling the liquid crystal panel, the backlight and the glasses using the backlight scanning technique will be described.

FIG. 1 is a schematic view illustrating a relationship between the liquid crystal panel and the light source in the liquid crystal display. FIG. 1 illustrates a liquid crystal panel 90 as seen from a display surface side. The liquid crystal display illustrated in FIG. 1 is a light guide type (edge light type) liquid crystal display, and includes the liquid crystal panel 90, and light sources 91 to 96 which irradiate the liquid crystal panel 90 with light. In addition, the liquid crystal display includes a light guide plate (not illustrated) which is disposed on a back surface side (surface side opposite to the display surface) of the liquid crystal panel 90 to guide light from the light sources 91 to 96 to the liquid crystal panel 90. The liquid crystal panel 90 is configured to perform the display control of the image for each display region (first region, second region, . . . , and sixth region) which is divided into six, for example, in a longitudinal direction (vertical direction) and respectively has a strip shape. The light guide plate has a size substantially the same as the liquid crystal panel 90. The light sources 91 to 96 are provided at positions respectively facing both end surfaces of the light guide plate in a lengthwise direction (lateral direction) thereof, that is, positions respectively corresponding to two short sides of each display region of the liquid crystal panel 90. Thereby, the respective light sources 91 to 96 irradiate each display region of the liquid crystal panel 90 with light through the light guide plate.

FIG. 2 is a view for describing control processing for the liquid crystal panel 90, the light sources 91 to 96 and glasses. FIG. 2 illustrates a change in a display image and a change in values of current applied to the light sources 91 to 96 with the passage of time, in each display region (first region, second region, . . . , and sixth region) of the liquid crystal panel 90, and further illustrates a change in sight control by the glasses with the passage of time. Further, FIG. 2 illustrates a time axis (lateral axis) for showing the change in the display image, and a time axis (lateral axis) and current values (vertical axis) for showing the change in the values of current applied to the light source 91, only for the first region, and the axes are not illustrated for the other display regions. Further, a time axis (lateral axis) for showing the change in the sight control by the glasses is also not illustrated.

In an example illustrated in FIG. 2, displaying of signals included in the image frame (right-eye or left-eye image frame) in each display region is sequentially started with predetermined time-lags in an order of the first region, the second region, . . . , and the sixth region, and one image frame is displayed on the liquid crystal panel 90 as a whole. The signals included in the right-eye and left-eye image frames are alternately displayed in each display region. The respective light sources 91 to 96 are controlled so as to irradiate each display region with light during a latter period within a period in which each display region displays each signal in the one image frame. Specifically, the light sources 91 to 96 are turned on when a predetermined time t has elapsed after the displaying of the signal in the one image frame in the display region corresponding thereto is started, and are turned off when displaying of the signal in the next image frame is started. Herein, the predetermined time t is time considering the time (transient response time) until each liquid crystal display element reaches transmittance based on the signal to be displayed. In addition, the values of current applied to the respective light sources 91 to 96 are the same as each other and the respective light sources 91 to 96 irradiate light having the same luminance as each other.

The glasses, for example, while the signal in the left-eye image frame is displayed in the sixth region, block the sight of the right eye and open only the sight of the left eye, and while the signal in the right-eye image frame is displayed in the sixth region, block the sight of the left eye and open only the sight of the right eye.

In this way, within the display period of the one image frame, the backlight is turned on only in the period in which the response of the liquid crystal display element has been subsided, such that the occurrence of crosstalk is suppressed, and the display performance of liquid crystal displays is improved.

However, when performing the control processing as illustrated in FIG. 2, the light from the light sources 91 to 96 which have been turned on enters (is leaked) into the display region corresponding to the light sources 91 to 96 which have been turned off, such that the crosstalk may occur. For example, in a period in which the right-eye image frame is displayed in the first region among the period in which the sight of the left eye is opened by the glasses, the light from the lighting light sources 92 to 96 enters into the first region, respectively. In this case, under the condition in which the sight of the left eye is opened, the light from the light sources 92 to 96 enters into the first region which is displaying the right-eye image frame, and thereby a part of the right-eye image frame is viewed by the left eye. Similarly, when the sight of the left eye is opened, the light from the light sources 93 to 96 enters into the second region which is displaying the right-eye image frame, and thereby a part of the right-eye image frame is viewed by the left eye. The similar crosstalk also occurs in the third to fifth regions. Further, when the sight of the left eye is opened, only the left-eye image frame is displayed in the sixth region, thus the crosstalk does not occur in the sixth region. In this way, when displaying the image on the liquid crystal panel 90 by scanning each display region in the order of the first region, the second region, . . . , and the sixth region, the occurring crosstalk is more apparent toward an upper portion of the screen (first region).

In order to suppress the occurrence of the above-described crosstalk, it is conceivable that a light guide plate capable of exactly dividing light is used, or an appropriate pattern is formed on the light guide plate, so that each light from the light sources 91 to 96 does not leak to a region other than the display regions corresponding thereto.

In addition, Japanese Patent Application Laid-Open No. 2010-276928 proposes a technique in which the turn on time (lighting time) of the light sources corresponding to the respective regions of the liquid crystal panel does not overlap with each other, thereby suppressing the occurrence of the 3D crosstalk.

SUMMARY

However, when using the ideal light guide plate or forming the pattern on the light guide plate, it is necessary for the light guide plate to be formed of a specific structure such as a divided structure, or the like, which causes an increase in manufacturing costs of the light guide plate. Further, it is very difficult to completely prevent the light from the light sources 91 to 96 from being leaked to a region other than the display regions corresponding thereto by forming the pattern on the light guide plate.

In addition, the technique disclosed in Japanese Patent Application Laid-Open No. 2010-276928 does not suppress the occurrence of crosstalk which occurs due to the leakage of the light from the respective light sources to a region other than the regions respectively corresponding thereto.

The present invention has been made with the aim of solving the above problems. It is an object of the present invention to provide a display apparatus and a display system capable of improving the impression of display performance given to a user.

A display apparatus according to the present invention comprises: a liquid crystal panel which displays an image signal including a plurality of image frames; and a plurality of light sources which are juxtaposed in a predetermined direction, and irradiate the liquid crystal panel with light. The display apparatus comprises: a display control unit which respectively displays signals corresponding to respective regions among each image frame included in the image signal, in the respective regions of the liquid crystal panel irradiated with light from the respective light sources, in an order from both end sides in an arrangement direction of the respective regions toward a center alternately with each other, respectively; and a light source control unit which irradiates the respective regions with light from the light sources corresponding to the respective regions, during a latter period within a period in which the display control unit respectively displays the signals in the respective regions of the liquid crystal panel.

In the display apparatus according to the present invention, the display control unit alternately displays each of a signal corresponding to the respective regions in an image frame for left eye and a signal corresponding to the respective regions in an image frame for right eye, in the respective regions of the liquid crystal panel.

The display apparatus according to the present invention comprises a black insertion unit which inserts black signals during at least a part of each image frame period included in the image signal. Further, the display control unit respectively displays the signals corresponding to the respective regions among each image frame included in the image signal into which the black signals are inserted by the black insertion unit, in the respective regions of the liquid crystal panel. In the display apparatus according to the present invention, the light source control unit irradiates the respective regions with light, in a latter period within a period in which the display control unit displays a signal other than the black signals inserted by the black insertion unit, among the signals corresponding to the respective regions in the each image frame, in the respective regions of the liquid crystal panel.

In the display apparatus according to the present invention, the light source control unit irradiates the respective regions with light by the light sources corresponding to the respective regions, during a period from a time point when a predetermined time has elapsed since the display control unit started displaying signals in each region of the liquid crystal panel to a time point when the display control unit starts displaying signals of the next image frame in each region.

A display system according to the present invention comprises: the above-described display apparatus; a glasses having a left-eye region and a right-eye region which are controlled passing/blocking of light, respectively; and a glasses control unit which respectively controls the passing/blocking of light in the left-eye region and the right-eye region of the glasses, in accordance with an image frame to be displayed in the respective regions of the liquid crystal panel by the display control unit of the display apparatus.

According to the present invention, even when the light from the respective light sources leaks to a region other than the regions respectively corresponding thereto, it is possible to improve the impression of display performance without giving the impression of a deterioration in the display performance to the user.

The above and further objects and features will more fully be apparent from the following detailed description with accompanying drawings.

BRIEF DESCRIPTION OF THE SEVERAL VIEWS OF THE DRAWINGS

FIG. 5 is a schematic view illustrating a relationship between the liquid crystal panel and the light source;

DETAILED DESCRIPTION

The following will describe in detail a display apparatus and a television receiver according to the present invention with reference to the drawings illustrating some embodiments applied to a television receiver.

Embodiment 1

Figure 1:
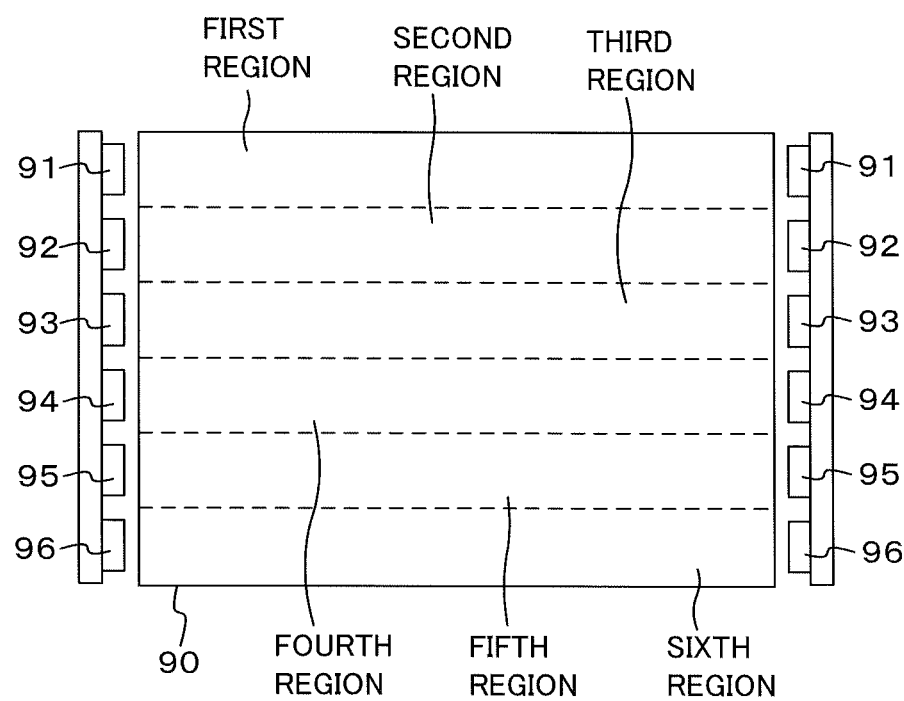
FIG. 1 is a schematic view illustrating a relationship between a liquid crystal panel and a light source in a liquid crystal display.
Figure 2:
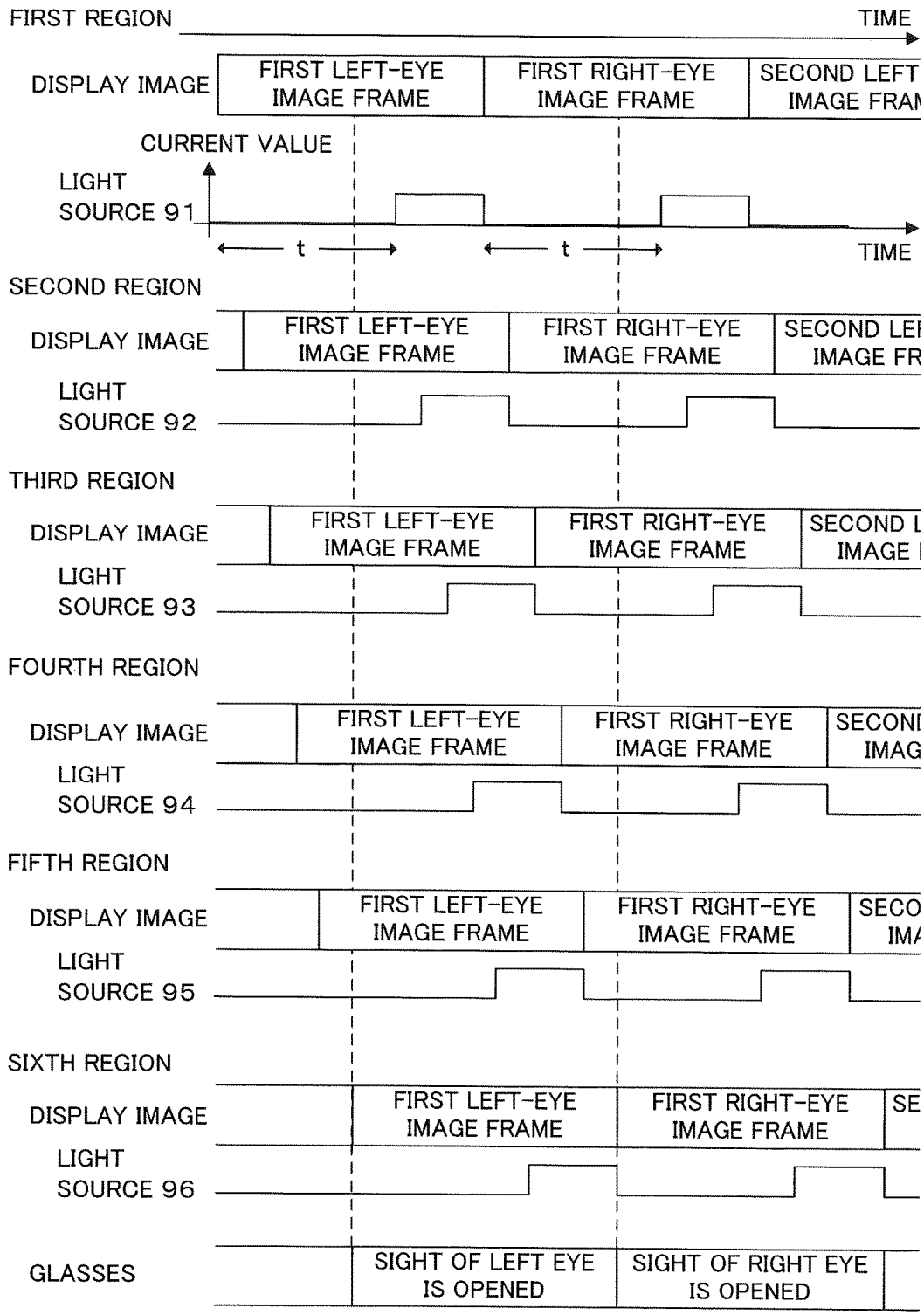
FIG. 2 is a view for describing control processing for the liquid crystal panel, light sources and glasses.
Figure 3:
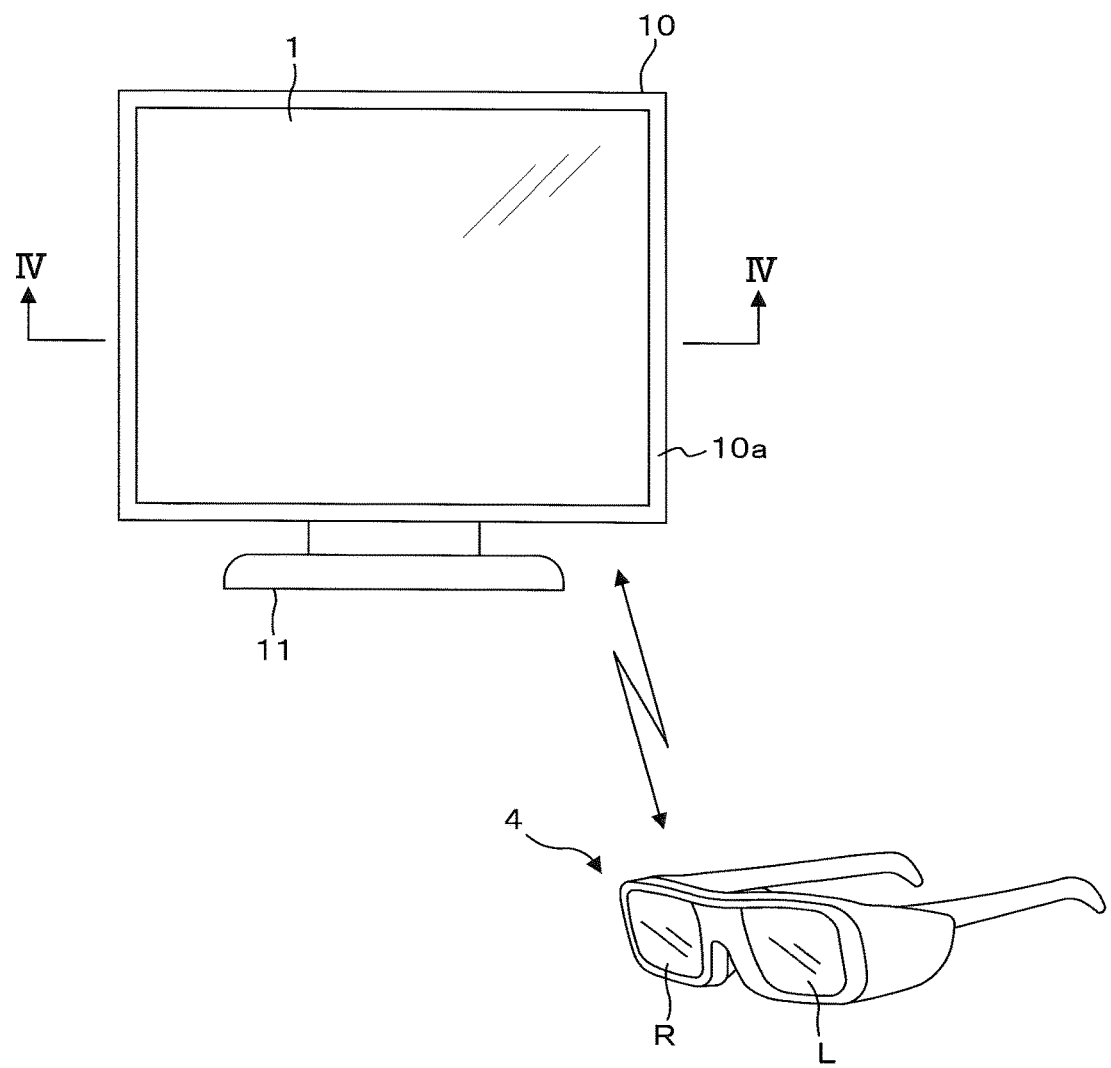
FIG. 3 is a front view illustrating an appearance of a television receiver according to Embodiment 1.

FIG. 3 is a front view illustrating an appearance of a television receiver according to Embodiment 1. A display screen side of the television receiver will be referred to as a front. The television receiver of Embodiment 1 includes a rectangular main unit 10 provided with a liquid crystal panel 1, and glasses 4 having a left-eye shutter L (left-eye region) and a right-eye shutter R (right-eye region) which can control the passing/blocking of light, respectively.

Each of the left-eye shutter L and the right-eye shutter R is, for example, a liquid crystal shutter, and is alternately opened or closed in accordance with an instruction from a glasses control unit 58 (see FIG. 6) to be described below, thereby providing the image displayed on the liquid crystal panel 1 to any one of the left-eye and right-eye of a user (viewer). Specifically, when a right-eye image (an image for right eye) is displayed on the liquid crystal panel 1, the left-eye shutter L is closed to block light and the right-eye shutter R is opened to pass light, thereby providing the right-eye image to the right-eye. Similarly, when a left-eye image (an image for left eye) is displayed on the liquid crystal panel 1, the right-eye shutter R is closed and the left-eye shutter L is opened, thereby providing the left-eye image to the left-eye. In this way, the television receiver of Embodiment 1 alternately displays the left-eye and right-eye images on the liquid crystal panel 1 by the frame sequential system, and alternately opens and closes the shutters L and R of the glasses 4 by an active shutter system. As a result, the user can enjoy the three-dimensional image by viewing the right-eye image and the left-eye image thereof by the right eye and the left eye respectively.

Further, the television receiver of Embodiment 1 includes a stand 11 for supporting the main unit 10. The stand 11 supports the main unit 10 in a state where the liquid crystal panel 1 is standing. The display apparatus and the display system according to the present invention is not limited to the television receiver in which the main unit 10 is supported by the stand 11, and they may be applied to a television receiver in which the main unit 10 is attached to an indoor wall, etc. Hereinafter, a left-and-right direction and an up-and-down direction of the television receiver illustrated in FIG. 3 will be referred to as a lateral direction and a vertical direction, respectively.

Figure 4:
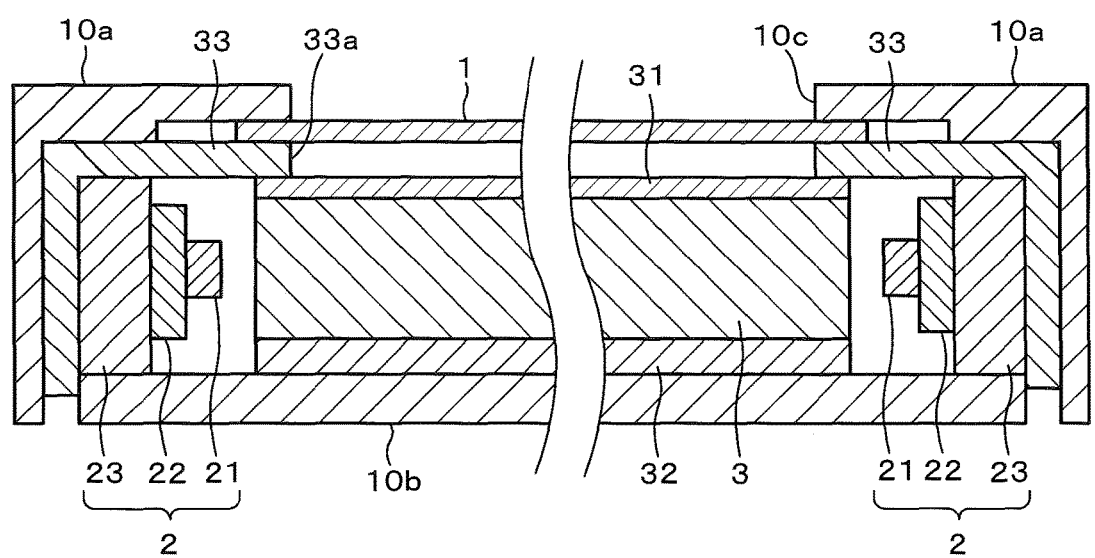
FIG. 4 is a cross-sectional view taken on line IV-IV in FIG. 3.

FIG. 4 is a cross-sectional view taken on line IV-IV in FIG. 3. The television receiver of Embodiment 1 is provided with the rectangular liquid crystal panel 1, so as to form a part of one side surface of the main unit 10. The liquid crystal panel 1 is formed, for example, by arranging a plurality of liquid crystal elements in a two-dimensional matrix shape. The main unit 10 has a housing including a frame-shaped front cover 10a which surrounds a peripheral edge of the liquid crystal panel 1 from the front side (display screen side) and a rectangular back cover 10b which closes a back surface side (rear surface side of the display screen) of the liquid crystal panel 1. In the main unit 10 (inside of the housing), a light guide plate 3 having a size substantially the same as the liquid crystal panel 1 is housed, and the light guide plate 3 is disposed with one surface thereof facing the back surface (rear surface of the display screen) of the liquid crystal panel 1. In addition, in the main unit 10, two light source units 2 are housed in a state of facing each of left and right end surfaces of the light guide plate 3.

Each of the light source units 2 includes a strip-shaped substrate 22 disposed to face one of the left and right end surfaces of the light guide plate 3, a plurality of light sources 21 mounted on the substrate 22 in a lengthwise direction thereof, and a square column-shaped holding plate 23 which holds the substrate 22 and the light sources 21. The light source 21 is, for example, a light emitting diode (LED), a cold cathode fluorescent lamp (CCFL), an external electrode fluorescent lamp (EEFL), a hot cathode fluorescent lamp (HCFL) or the like. According to Embodiment 1, as will described with reference to FIG. 5 below, six light sources 21 (21a to 21f) are mounted on the respective substrates 22 at an equal interval, and the respective light sources 21 are disposed so as to irradiate the end surface of the light guide plate 3 with the light.

The light guide plate 3 is made of a high transparency acrylic resin, for example, and converts light made incident on the left and right end surfaces from the light source unit 2 (light source 21) into flat light to irradiate the liquid crystal panel 1 with the flat light. One surface of the light guide plate 3 facing the liquid crystal panel 1 is provided with an optical sheet 31, and the other surface thereof is provided with a reflection sheet 32. The reflection sheet 32 is formed of a white resin having excellent light reflecting properties, for example, and reflects the light made incident on the light guide plate 3 from the light source unit 2. A surface of the reflection sheet 32 facing the light guide plate 3 may be applied with a paint having excellent light reflecting properties.

The light reflected by the reflection sheet 32 passes through the light guide plate 3 to be made incident on the optical sheet 31. The optical sheet 31 has, for example, a diffusion sheet, a light collecting sheet, and the like. The diffusion sheet uniformly diffuses the light reflected by the reflection sheet 32 and passing through the light guide plate 3, and the light collecting sheet collects the light, and then the optical sheet 31 irradiates the liquid crystal panel 1 with a uniform flat light.

By the above-described configuration, a backlight which illuminates the liquid crystal panel 1 from the back surface side can be realized by the light source units 2, the light guide plate 3, the optical sheet 31, and the reflection sheet 32.

A surface of the light guide plate 3 facing the optical sheet 31 may be formed with a pattern which is configured to appropriately guide the light made incident thereon from the light source unit 2 and reflected by the reflection sheet 32 toward the liquid crystal panel 1. In this case, the light guide plate 3 can uniformly transmit the light reflected by the reflection sheet 32 to the optical sheet 31.

The backlight (light source units 2, light guide plate 3, optical sheet 31, and reflection sheet 32) having the above-described configuration is held (pinched) by a backlight holding part 33 and the back cover 10b. The backlight holding part 33 is formed in a frame shape which surrounds the peripheral edge of the light guide plate 3 on which the optical sheet 31 and the reflection sheet 32 are provided (hereinafter briefly referred to as the light guide plate 3) from the liquid crystal panel 1 side. Specifically, the backlight holding part 33 is formed in a shape which surrounds the peripheral edge of the optical sheet 31. More Specifically, the backlight holding part 33 is formed in a frame shape having an L-shaped cross section by providing an opening part 33a having a slightly smaller rectangular cross section than the optical sheet 31 on a bottom of a shallow dish-shaped plate member. The back cover 10b is formed in a larger rectangular shape than the optical sheet 31 (reflection sheet 32 and light guide plate 3).

The peripheral edge of the surface of the optical sheet 31 facing the liquid crystal panel 1 abuts an inner surface of the backlight holding part 33 along the opening part 33a, and the back surface (rear surface of the surface facing the light guide plate 3) of the reflection sheet 32 abuts a center of the back cover 10b. The backlight holding part 33 and the back cover 10b are fixed to each other while the backlight holding part 33 presses the light guide plate 3 to the back cover 10b, such that the light guide plate 3 is pinched (fixed) by the backlight holding part 33 and the back cover 10b. In addition, in a space sandwiched by the backlight holding part 33 and the back cover 10b, the two light source units 2 are disposed so that the light sources 21 face the two opposite end surfaces (left and right end surfaces) of the light guide plate 3. Similarly, the light source units 2 are also pinched (fixed) by the backlight holding part 33 and the back cover 10b.

The front cover 10a is slightly larger than the backlight holding part 33, and is formed in the same frame shape as the backlight holding part 33. An outer surface of the backlight holding part 33 along the opening part 33a abuts the peripheral edge of the back surface (rear surface of the display screen) of the liquid crystal panel 1, and the peripheral edge of the display screen of the liquid crystal panel 1 abuts the inner surface of the front cover 10a along an opening part 10c thereof. The inner surface of the front cover 10a abuts the peripheral edge of the display screen of the liquid crystal panel 1, and abuts the outer surface of the backlight holding part 33. Thereby, in a plane part of the front cover 10a having the opening part 10c, the opening part 10c side is thinly formed by as much as the thickness of the liquid crystal panel 1. The front cover 10a and the backlight holding part 33 (back cover 10b) are fixed to each other while the front cover 10a presses the liquid crystal panel 1 to the backlight holding part 33, such that the liquid crystal panel 1 is pinched (fixed) by the front cover 10a and the backlight holding part 33 (back cover 10b).

FIG. 5 is a schematic view illustrating a relationship between the liquid crystal panel 1 and the light source 21. FIG. 5 illustrates the liquid crystal panel 1, the light sources 21 (21a to 21f), and the substrates 22 when seeing the television receiver of Embodiment 1 from the display screen side. As illustrated by a dashed line in FIG. 5, in the television receiver of Embodiment 1, the display region of the liquid crystal panel 1 is divided into six regions in the vertical direction, and the display control of the image with respect to the respective strip-shaped regions 1a, 1b, 1c, 1d, 1e, and 1f is individually executed. The respective regions are referred to as a first region 1a, a second region 1b, . . . , and a sixth region 1f in the order from the top. The respective light source units 2 have six light sources 21, and the respective light sources 21a, 21b, 21c, 21d, 21e, and 21f are disposed at positions corresponding to the respective regions 1a, 1b, 1c, 1d, 1e, and 1f of the liquid crystal panel 1. Specifically, the respective light sources 21a, 21b, 21c, 21d, 21e, and 21f are disposed to face each of the left and right end surfaces of the respective regions of the light guide plate 3 facing the respective regions 1a, 1b, 1c, 1d, 1e, and 1f of the liquid crystal panel 1.

In the above-described configuration, the light from the two light sources 21a is emitted to the first region 1a of the liquid crystal panel 1 through the light guide plate 3. Similarly, the light from the two light sources 21b is emitted to the second region 1b, the light from the two light sources 21c is emitted to the third region 1c, and the light from the two light sources 21d is emitted to the fourth region 1d. In addition, the light from the two light sources 21e is emitted to the fifth region 1e, and the light from the two light sources 21f is emitted to the sixth region 1f.

In the television receiver of Embodiment 1, the same driving control is performed on the respective two light sources of the light sources 21a to 21f, but each different driving control is performed on each of the light sources 21a to 21f.

Figure 6:
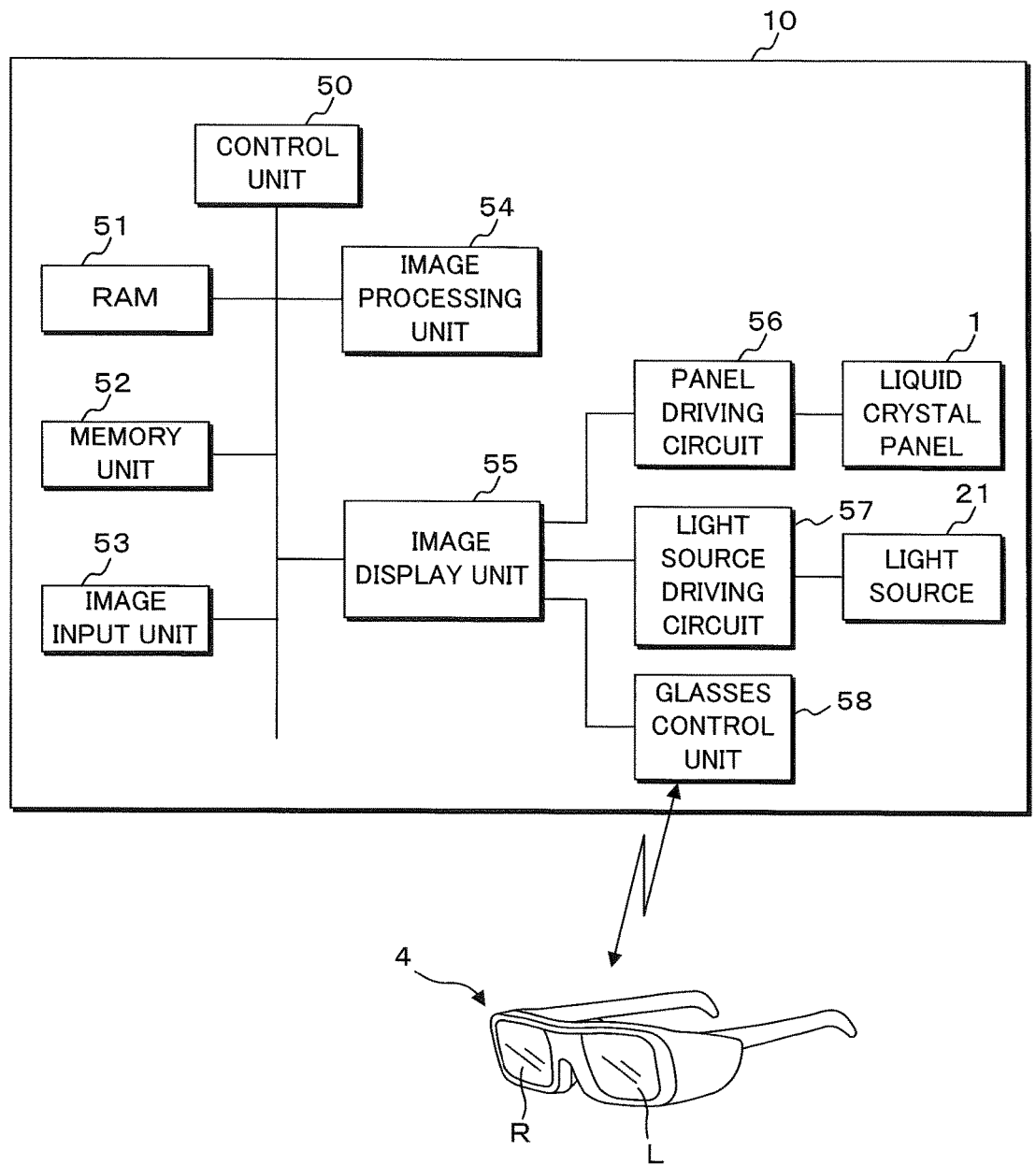
FIG. 6 is a block view illustrating an internal configuration example of the television receiver of Embodiment 1.

FIG. 6 is a block view illustrating an internal configuration example of the television receiver of Embodiment 1. The television receiver of Embodiment 1 includes a control unit 50, a random access memory (RAM) 51, a memory unit 52, an image input unit 53, an image processing unit 54, an image display unit 55 and the like, in the main unit 10. The television receiver of Embodiment 1 may include an operation unit for allowing a user to operate the television receiver, a receiver receiving a signal output from a remote controller for allowing a user to remotely operate the television receiver, and the like, in addition the above-described configuration.

The control unit 50 is a central processing unit (CPU), a microprocessor unit (MPU) and the like. The control unit 50 appropriately loads and executes a control program stored in the memory unit 52 into an RAM 51 to control each above-described hardware unit, thereby the television receiver operates as the display apparatus and the display system according to the present invention.

The RAM 51 is a static RAM (SRAM), a dynamic RAM (DRAM), a flash memory and the like. The RAM 51 temporarily stores various data which are generated when the control unit 50 executes the control program. The memory unit 52 is nonvolatile memories such as an electrically erasable and programmable ROM (EEPROM), a flash memory, a hard disk drive (HDD) and the like. The memory unit 52 previously stores control programs and various data to be executed by the control unit 50.

The image input unit 53 can be connected with, for example, the tuner receiving a broadcast signal of television broadcast, a recording and playback apparatus, a digital camera, a personal computer (PC), and the like, and acquires an image signal sent from any one of the apparatuses. The image input unit 53 sends the acquired image signal to the image processing unit 54.

The image processing unit 54 executes various kinds of signal processing on the image signal acquired from the image input unit 53 to display an image on the liquid crystal panel 1, and sends the processed image signal to the image display unit 55. The image signal sent from the image processing unit 54 includes, for example, 120 image frames per one second. The 120 image frames include 60 left-eye image frames and 60 right-eye image frame, which are alternately arranged, respectively.

The image display unit 55 is connected with a panel driving circuit 56 for driving the liquid crystal panel 1, a light source driving circuit 57 for controlling the turn on and off of the light source 21, and a glasses control unit 58 for controlling the open and close of the shutters L and R of the glasses 4. The image display unit 55 controls the operation of the panel driving circuit 56, the light source driving circuit 57 and the glasses control unit 58 based on the image signal acquired from the image processing unit 54 in accordance with the instruction from the control unit 50.

The panel driving circuit 56 individually performs the image display control for the respective regions 1a to 1f of the liquid crystal panel 1, as illustrated in FIG. 5, in accordance with the instruction from the image display unit 55. The light source driving circuit 57 individually performs the driving control for the respective light sources 21a to 21f corresponding to the respective regions 1a to 1f of the liquid crystal panel 1 in accordance with the instruction from the image display unit 55. The glasses control unit 58 individually performs the opening and closing control for the respective shutters L and R of the glasses 4 in accordance with the instruction from the image display unit 55.

The glasses control unit 58 and the glasses 4 are configured to wirelessly communicate with each other, and the glasses control unit 58 sends a shutter control signal for respectively opening and closing the left-eye shutter L and the right-eye shutter R to the glasses 4 through the wireless communication. The glasses 4 have a receiving unit (not illustrated) which receives the shutter control signal sent from the glasses control unit 58, and a driving unit (not illustrated) which opens and closes each of the left-eye shutter L and right-eye shutter R by respectively applying a driving voltage thereto. The driving unit applies the driving voltage according to the shutter control signal acquired from the glasses control unit 58 to each of the left-eye shutter L and the right-eye shutter R, and the left-eye shutter L and the right-eye shutter R are opened and closed in accordance with the driving voltage applied thereto. The shutter control signal sent to the glasses 4 by the glasses control unit 58 is a signal for instructing alternative opening and closing of the left-eye shutter L and the right-eye shutter R, and thereby allowing the left-eye shutter L and the right-eye shutter R to be alternatively opened and closed.

In the above-described configuration, when the left-eye image is displayed on the liquid crystal panel 1, the image display unit 55 closes the right-eye shutter R and opens the left-eye shutter L. Alternately, when the right-eye image is displayed on the liquid crystal panel 1, the image display unit 55 closes the left-eye shutter L and opens the right-eye shutter R. Thereby, the user views the left-eye image by the left eye and the right-eye image by the right eye, and therefore, it is possible to enjoy the three-dimensional image.

Figure 7:
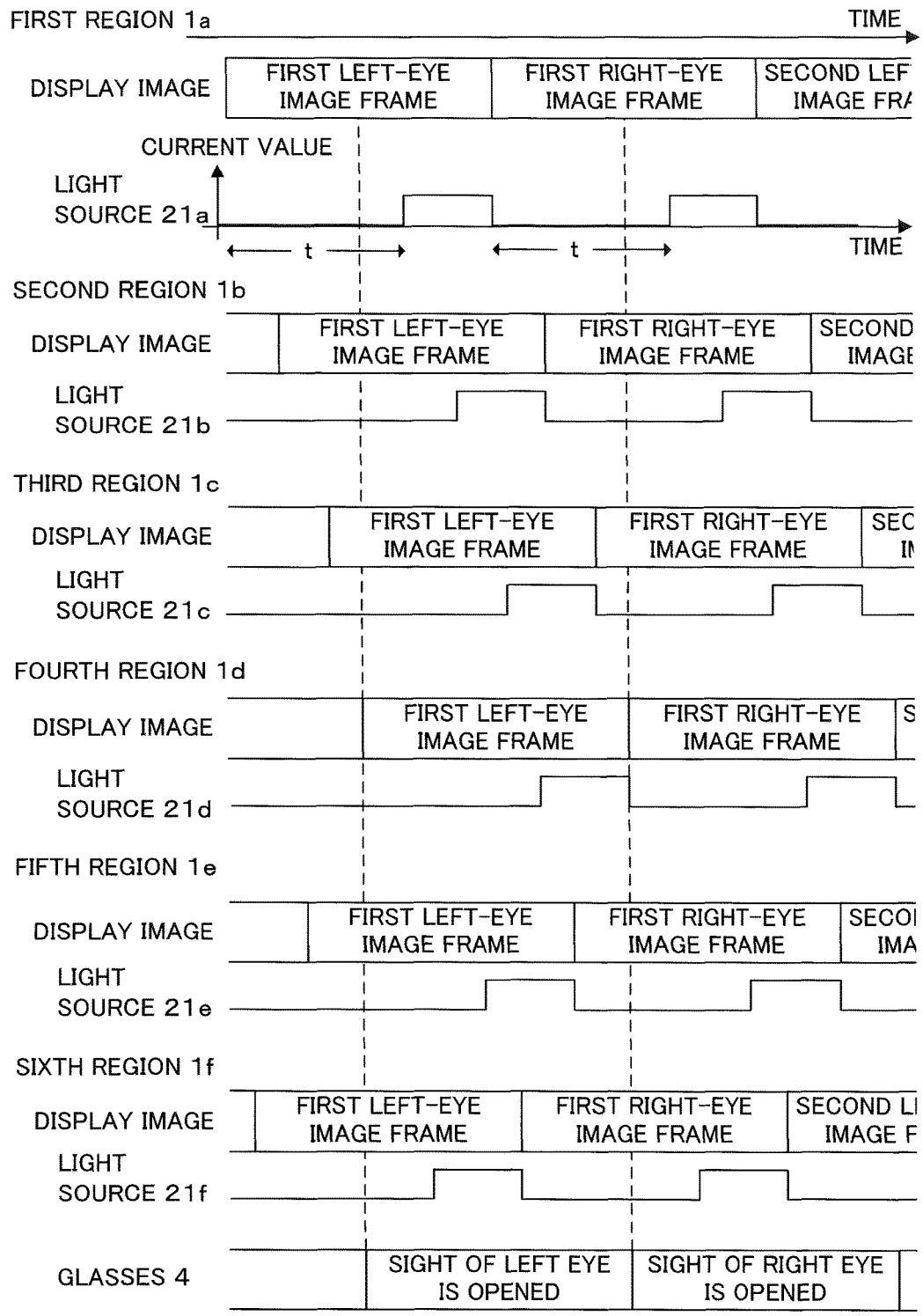
FIG. 7 is a view for describing the control processing for the liquid crystal panel, the light source and glasses.

FIG. 7 is a view for describing control processing for the liquid crystal panel 1, the light source 21 and the glasses 4 (shutters L and R). FIG. 7 illustrates a change in the display image and a change in values of current applied to the respective light sources 21a to 21f with the passage of time, in the respective regions 1a to 1f of the liquid crystal panel 1. FIG. 7 also illustrates a change in sights (sights of left eye and right eye) opened by the glasses 4 (shutters L and R) with the passage of time. FIG. 7 illustrates a time axis (lateral axis) for showing the change in the display image, and the time axis (lateral axis) and a current value (vertical axis) for showing the change in the values of current applied to the light source 21a, only for the first region 1a. Though the time axis (lateral axis) and the current value (vertical axis) for the other regions 1b to 1f are not illustrated, they are the same as the axes for the first region 1a. In addition, the time axis (lateral axis) for showing the change in sights for the other regions 1b to 1f is also not illustrated.

As illustrated in FIG. 7, the panel driving circuit (display control unit) 56 of Embodiment 1 displays the image frames (left-eye and right-eye image frames) in the respective regions 1a to 1f with predetermined time lags in an order of the first region 1a, the sixth region 1f, the second region 1b, the fifth region 1e, the third region 1c, and the fourth region 1d. The panel driving circuit 56 displays the signals to be displayed in each of the regions 1a to 1f among the signals included in each image frame in the respective regions 1a to 1f, thereby displaying one image frame using the six regions 1a to 1f. That is, the panel driving circuit 56 respectively displays the signals in the respective regions 1a to 1f corresponding thereto, in an order from both end sides (the region 1a and 1f) in an arrangement direction (vertical direction) of the regions 1a to 1f toward a center (the region 1c and 1d) thereof alternately with each other respectively.

The light source driving circuit (light source control unit) 57 turns on the respective light sources 21a to 21f corresponding to the respective regions 1a to 1f, during a period from a time point when a predetermined time t has elapsed since the panel driving circuit 56 started displaying the image frames (left-eye or right-eye image frame) in the respective regions 1a to 1f to a time point when the panel driving circuit 56 starts displaying the next image frame in the respective regions 1a to 1f. Specifically, the respective light sources 21a to 21f are turned on when the predetermined time t has elapsed after the displaying of the signals included in the image frame in the respectively corresponding regions 1a to 1f is started, and are turned off when the displaying of the signals included in the next image frame in the respectively corresponding regions 1a to 1f is started. Herein, the predetermined time t is time considering the time (transient response time) until each liquid crystal display element reaches transmittance based on the signal to be displayed.

In this way, within the display period of the one image frame, the light sources 21a to 21f are turned on only in the period in which the response of the liquid crystal display element has been subsided, such that the occurrence of crosstalk is suppressed, and the display performance thereof is improved.

The glasses control unit 58 opens one of the left-eye shutter L and the right-eye shutter R and closes the other thereof in synchronization with a time when the panel driving circuit 56 displays the image frame (left-eye or right-eye image frame) in respective regions 1a to 1f. In the example illustrated in FIG. 7, in a period in which the signal in the left-eye image frame is displayed in the fourth region 1d where the 6-th image is displayed, the left-eye shutter L is opened and the right-eye shutter R is closed. In addition, in a period in which the signal in the right-eye image frame is displayed in the fourth region 1d, the right-eye shutter R is opened and the left-eye shutter L is closed.

In the television receiver of Embodiment 1, the image display unit 55 controls the panel driving circuit 56, the light source driving circuit 57 and the glasses control unit 58 based on the image signal (image frame) acquired from the image processing unit 54, and executes the image display control for the liquid crystal panel 1, the driving control for the light source 21 and the opening and closing control for the shutters L and R of the glasses 4, thereby achieving the control processing as illustrated in FIG. 7.

When configuring as described above, in a period in which the sight of the left eye is opened (the left-eye shutter L is opened and the right-eye shutter R is closed), the signals in the right-eye image frame as well as the left-eye image frame are displayed in the first region 1a. Moreover, when the signal in the right-eye image frame is displayed in the first region 1a, the light from the light sources 21b to 21f enters into the first region 1a, such that a part of the right-eye image frame is viewed by the left eye, and thereby the crosstalk occurs. Alternately, in a period in which the sight of the right eye is opened (the right-eye shutter R is opened and the left-eye shutter L is closed), the signals in the left-eye image frame as well as the right-eye image frame are displayed in the first region 1a. Moreover, when the signal in the left-eye image frame is displayed in the first region 1a, the light from the light sources 21b to 21f enters into the first region 1a, such that a part of the right-eye image frame is viewed by the left eye, and thereby the crosstalk occurs.

Similarly, in the period in which the sight of the left eye is opened, the signals in the right-eye image frame as well as the left-eye image frame are displayed in the sixth region 1f. Moreover, when the signal in the right-eye image frame is displayed in the sixth region 1f, the light from the light sources 21b to 21e enters into the sixth region 1f, such that a part of the right-eye image frame is viewed by the left eye, and thereby the crosstalk occurs. Further, in the period in which the sight of the right eye is opened, the signals in the left-eye image frame as well as the right-eye image frame are displayed in the sixth region 1f. Moreover, when the signal in the left-eye image frame is displayed in the sixth region 1f, the light from the light sources 21b to 21e enters into the sixth region 1f, such that a part of the left-eye image frame is viewed by the right eye, and thereby the crosstalk occurs.

Such a crosstalk occurs in the respective regions 1a to 1c, and 1e and 1f other than the fourth region 1d. Further, in the period in which the sight of the left eye (right eye) is opened, the period in which the signal in the right-eye (left-eye) image frame is displayed in the respective regions 1a to 1c, and 1e and 1f is shortened in an order of the first region 1a, the sixth region 1f, the second region 1b, the fifth region 1e and the third region 1c. In addition, in the period in which the sight of the left eye (right eye) is opened, an amount of light entering into the respective regions 1a to 1c, and 1e and 1f in which the signal in the right-eye (left-eye) image frame is displayed, from the light sources 21a to 21f other than the light sources 21a to 21f corresponding thereto is decreased in the order of the first region 1a, the sixth region 1f, the second region 1b, the fifth region 1e and the third region 1c. Thereby, the magnitude of crosstalk occurring thereon is decreased in the order of the first region 1a, the sixth region 1f, the second region 1b, the fifth region 1e and the third region 1c.

In the case of the fourth region 1d, only the signal in the left-eye image frame is displayed in the period in which the sight of the left eye is opened, and only the signal in the right-eye image frame is displayed in the period in which the sight of the right eye is opened, such that the crosstalk does not occur in the fourth region 1d.

As described above, in the configuration of Embodiment 1, the crosstalk, which occurs when the light from the respective light sources 21a to 21f enters (is leaked) into the regions 1a to 1f other than the regions 1a to 1f corresponding thereto, is minimized at the center (fourth region 1d) of the screen.

Conventionally, the crosstalk is increased toward an upper portion of the screen (first region 1a), and the crosstalk at a lower portion of the screen (sixth region 1f) has been minimized. It is known in the art that the impression of a deterioration in the display performance given to the user affected by the crosstalk occurring at the center of the screen is larger than that of by the crosstalk occurring at the end portion of the screen. Accordingly, as described in Embodiment 1, by controlling so as to minimize the crosstalk at the center (fourth region 1d) of the screen, although the crosstalk at the lower portion of the screen (sixth region 1f) is more deteriorated than ever before, it is possible to reduce the impression of a deterioration in the display performance given to the user. Thereby, even when the light from the respective light sources 21a to 21f is leaked to the regions 1a to 1f other than the regions 1a to 1f corresponding thereto, it is possible to improve the display quality of the liquid crystal panel 1 as a whole, and provide high display quality than ever before.

Embodiment 2

Hereinafter, a television receiver according to Embodiment 2 will be described. The television receiver of Embodiment 2 has the same configuration as the above-described television receiver of Embodiment 1, and the same units of the configuration thereof will be denoted by the same reference numerals, and will not be described.

Figure 8:
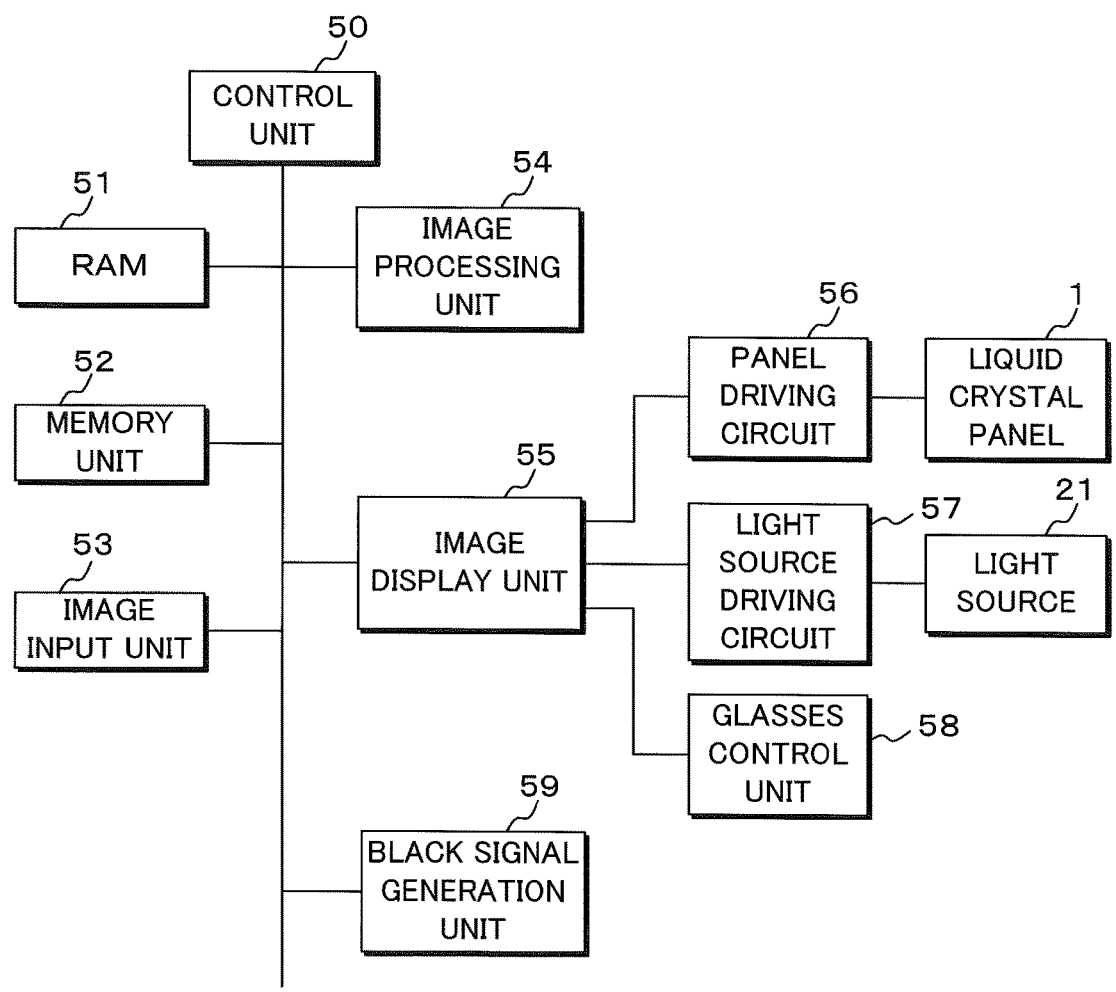
FIG. 8 is a block view illustrating an internal configuration example of the television receiver of Embodiment 2.

FIG. 8 is a block view illustrating an internal configuration example of the television receiver according to Embodiment 2. The television receiver of Embodiment 2 includes a black signal generation unit 59, in addition to the control unit 50, the RAM 51, the memory unit 52, the image input unit 53, the image processing unit 54, the image display unit 55 and the like.

The black signal generation unit 59 generates black signals to be inserted (replaced) within each frame period, with respect to each image frame (left-eye and right-eye frame) included in the image signals processed by the image processing unit 54. The black signal generation unit 59 executes generation processing of the black signal in accordance with an instruction from the control unit 50, and sends the generated black signal to the image display unit 55.

The control unit 50 determines whether the black signal is to be generated in accordance with the instruction from the user, and if it is determined that the black signal is to be generated, the control unit 50 instructs the black signal generation unit 59 to execute the generation processing of the black signal. For example, when the user performs the display instruction in a high image quality mode, the control unit 50 determines that the black signal is to be generated. In addition, the control unit 50 determines whether the image based on the image signal processed by the image processing unit 54 is a fast moving image, and if it is determined that the image is the fast moving image, the control unit 50 determines that the black signal is to be generated.

The image display unit (black insertion unit) 55 of Embodiment 2 executes the processing of inserting the black signal generated by the black signal generation unit 59 into each image frame (left-eye and right-eye frame) of the image signal acquired from the image processing unit 54, in accordance with the instruction from the control unit 50. Specifically, the image display unit 55 changes (replaces) the image signal in a latter half portion within each frame period of the image signal acquired from the image processing unit 54 into the black signal. Thereby, in this case, the image display unit 55 displays the image in which the black signal is inserted between the left-eye signals (image signals) and the right-eye signals (image signals) which follow in time sequence on the liquid crystal panel 1. A period in which the black signal is inserted is not limited to the latter half period within each frame period, and may be a predetermined period within each frame period.

The image display unit 55 of Embodiment 2 controls the panel driving circuit 56, the light source driving circuit 57 and the glasses control unit 58 based on each frame (each of the left-eye and right-eye frames) included in the image signal generated by inserting a black signal into the image signal acquired from the image processing unit 54. Thereby, the image display control for the liquid crystal panel 1, the driving control for the light source 21 and the opening and closing control for the glasses 4 (shutters L and R) are executed.

Figure 9:
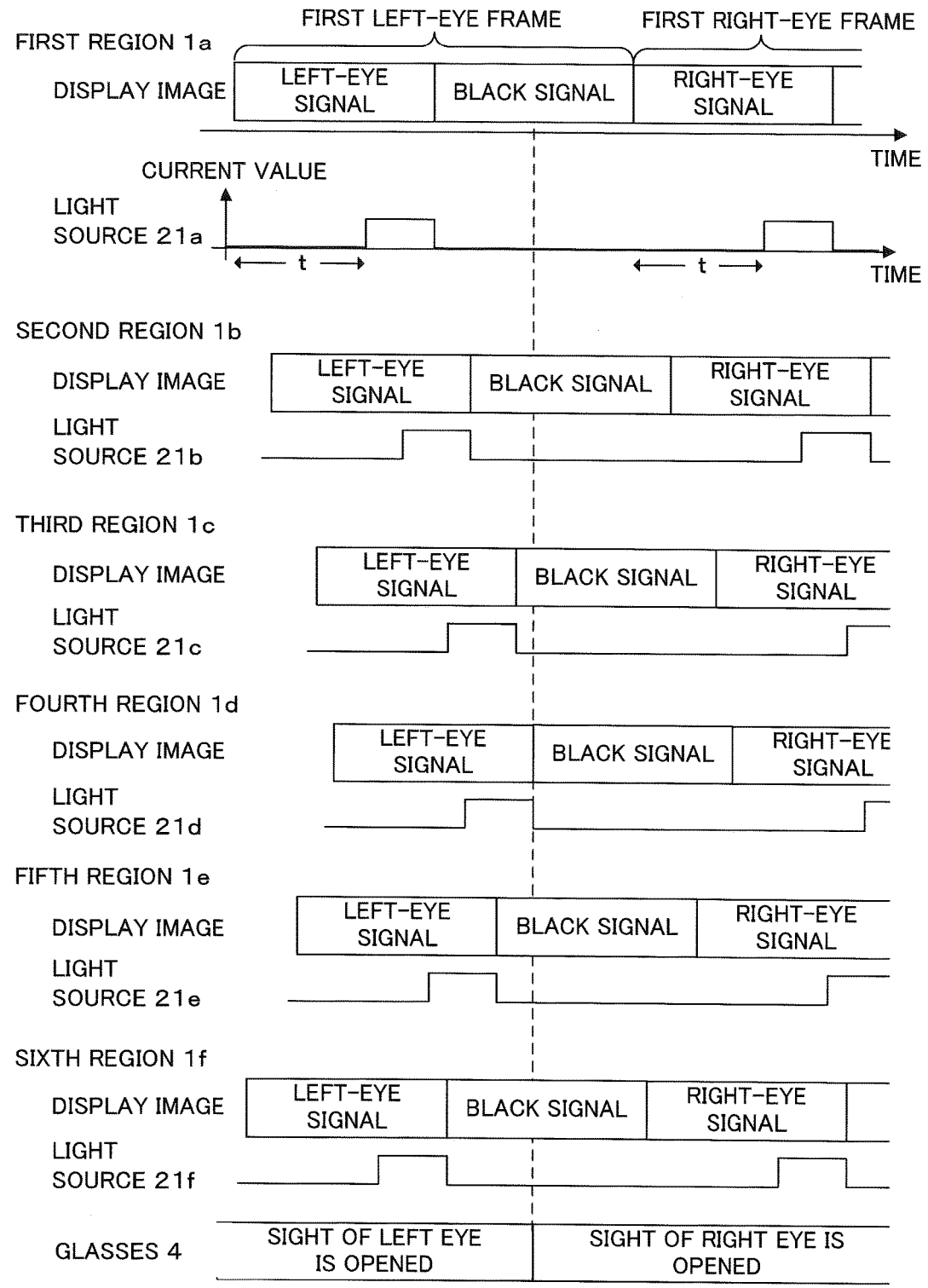
FIG. 9 is a view for describing the control processing for a liquid crystal panel, a light source and glasses according to Embodiment 2.

FIG. 9 is a view for describing the control processing for the liquid crystal panel 1, the light source 21 and the glasses 4 (shutters L and R) according to Embodiment 2. As similar to FIG. 7, FIG. 9 illustrates a change in the display image and a change in values of current applied to the respective light sources 21*a* to 21*f* with the passage of time, and also illustrates a change in sights opened by the glasses 4 with the passage of time, in the respective regions 1*a* to 1*f* of the liquid crystal panel 1.

As illustrated in FIG. 9, the panel driving circuit 56 of Embodiment 2 displays the signal included in each frame in the respective regions 1*a* to 1*f* with predetermined time lags in an order of the first region 1*a*, the sixth region 1*f*, the second region 1*b*, the fifth region 1*e*, the third region 1*c*, and the fourth region 1*d*, thereby displaying one frame using the six regions 1*a* to 1*f*. Specifically, the panel driving circuit 56 displays the signal to be displayed in the respective regions 1*a* to 1*f* among the signal (left-eye or right-eye signal) or the black signal included in each image frame, in each of the regions 1*a* to 1*f*.

The light source driving circuit 57 of Embodiment 2 turns on the respective light sources 21*a* to 21*f* corresponding to the respective regions 1*a* to 1*f*, during a period from a time point when a predetermined time t has elapsed since the panel driving circuit 56 started displaying the left-eye signals or right-eye signals (image signals) in the respective regions 1*a* to 1*f* to a time point when the panel driving circuit 56 starts displaying the next black signal in the respective regions 1*a* to 1*f*. Specifically, the respective light sources 21*a* to 21*f* are turned on when the predetermined time t has elapsed after the displaying of the left-eye signals or right-eye signals (image signals) in the respectively corresponding regions 1*a* to 1*f* is started, and are turned off when the displaying of the black signals in the respectively corresponding regions 1*a* to 1*f* is started. Herein, the predetermined time t is time considering the time (transient response time) until each liquid crystal display element reaches transmittance based on the signal to be displayed.

In this way, while the black signal is inserted between the signals (left-eye signal and right-eye signal) which follow in time sequence, the respective light sources 21*a* to 21*f* are turned on only in the predetermined period among the period of displaying the signal in the respective regions 1*a* to 1*f*, and thereby it is possible to achieve the pseudo impulse type display control, and suppress the occurrence of the crosstalk. Thereby, even when displaying the fast moving image, the moving image can be sharply displayed, and the moving image display performance can be improved.

As illustrated in FIG. 9, the glasses control unit 58 of Embodiment 2 opens the left-eye shutter L and closes the right-eye shutter R, during a period from a time point when the displaying of the black signal in the right-eye frame in the fourth region 1*d* where the 6-th image is displayed is started to a time point when the displaying of the signal (image signal) in the next left-eye frame in the fourth region 1*d* is ended. Alternately, the glasses control unit 58 opens the right-eye shutter R and closes the left-eye shutter L, during a period from a time point when the displaying of the black signal in the left-eye frame in the fourth region 1*d* is started to a time point when the displaying of the signal (image signal) in the next right-eye frame in the fourth region 1*d* is ended.

By the above-described configuration, the user views the left-eye image by the left eye and the right-eye image by the right eye, and therefore, it is possible to enjoy the three-dimensional image.

In the case of configuring as described above, when the sight of the left eye is opened (the left-eye shutter L is opened and the right-eye shutter R is closed) and the left-eye signal is displayed in the first region 1*a*, a part of the light from the light sources 21*b* and 21*f* as well as the light from the light source 21*a* enter in the first region 1*a*. Further, when the sight of the right eye is opened (the right-eye shutter R is opened and the left-eye shutter L is closed) and the right-eye signal is displayed in the first region 1*a*, a part of the light from the light sources 21*b* and 21*f* as well as the light from the light source 21*a* enter in the first region 1*a*.

Similarly, when the sight of the left eye is opened and the left-eye signal is displayed in the sixth region 1*f*, a part or all of the light from the light sources 21*a*, 21*b* and 21*e* as well as the light from the light source 21*f* corresponding to the sixth region 1*f* enter in the sixth region 1*f*. Alternately, when the sight of the right eye is opened and the right-eye signal is displayed in the sixth region 1*f*, a part or all of the light from the light sources 21*a*, 21*b* and 21*e* as well as the light from the light source 21*f* corresponding to the sixth region 1*f* enter in the sixth region 1*f*. Also, in each of the second region 1*b* to fifth region 1*e*, the light from the light sources 21*a* to 21*f* other than the light sources 21*b* to 21*e* corresponding to each region 1*b* to 1*e* enters.

In a period in which the black signals are displayed in the respective regions 1a to 1f, even when the light from the light sources 21a to 21f other than light sources 21a to 21f corresponding thereto enters, an effect by the entering light is small. Thereby, the effect due to the light being entered from the light sources 21a to 21f other than light sources 21a to 21f corresponding thereto is different from each other depending on the respective regions 1a to 1f, and when displaying the image on the liquid crystal panel 1 by scanning the first region 1a, the sixth region 1f, the second region 1b, the fifth region 1e, the third region 1c and the fourth region 1d in this order, the effect is maximized at the fourth region 1d.

As described above, in the configuration of Embodiment 2, the light from respective light sources 21a to 21f enters (is leaked) into the regions 1a to 1f other than the regions 1a to 1f corresponding thereto, such that the luminance at the center of the screen is more increased than that of an upper portion of the screen, and maximized at the fourth region 1d.

It is known in the art that the impression of a deterioration in the display performance given to the user affected by the reducing of the luminance occurring at the center of the screen is larger than that of by the reducing of the luminance at the end portion of the screen. Thereby, as described in Embodiment 2, by controlling so as to maximize the luminance at the center (fourth region 1d) of the screen, it is possible to reduce the impression of a deterioration in the display performance given to the user, and thereby, it is possible to improve the display quality of the liquid crystal panel 1 as a whole.

Figure 10:
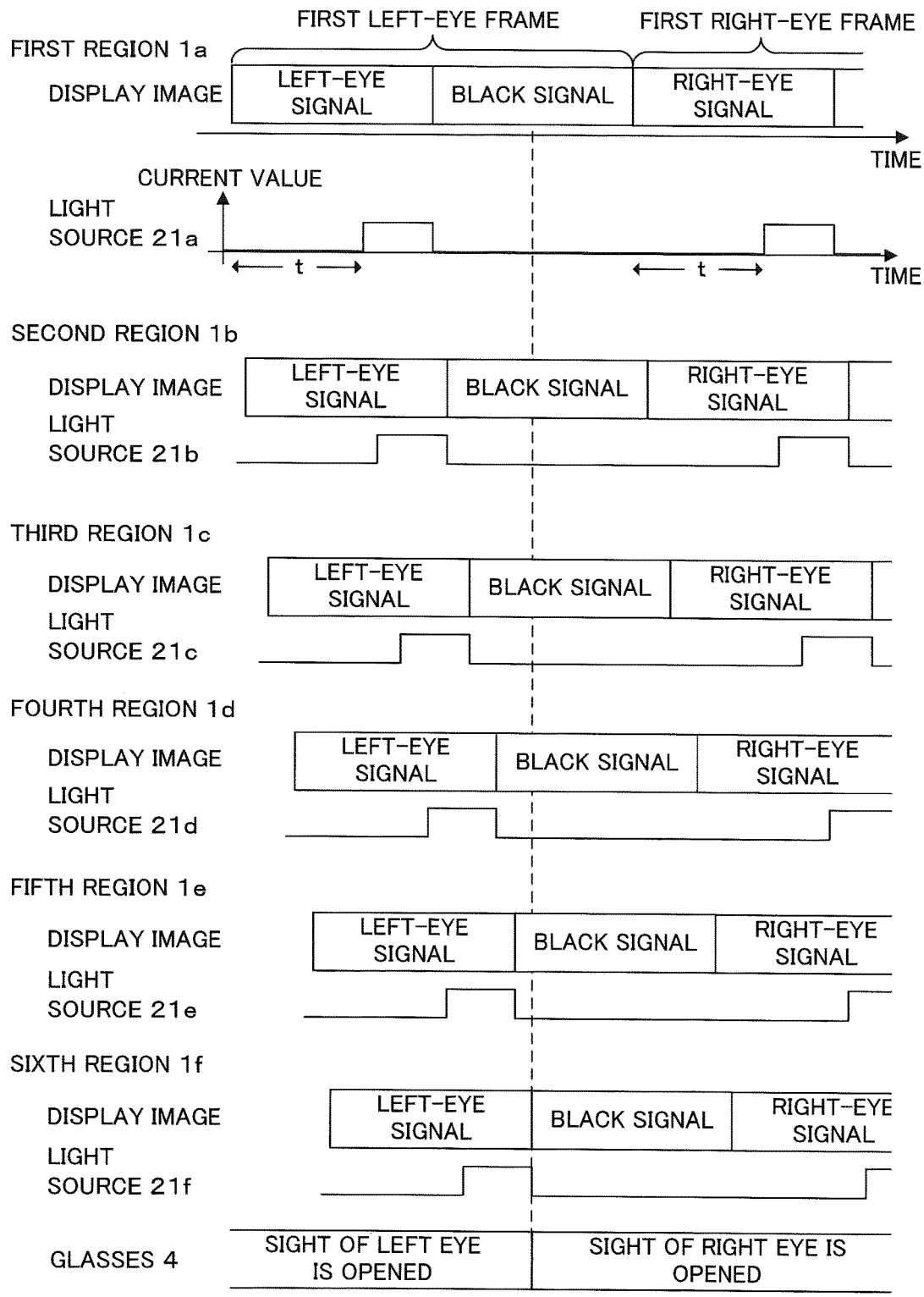
FIG. 10 is a view for describing conventional control processing for the liquid crystal panel, the light source and the glasses.

FIG. 10 is a view for describing the conventional control processing for the liquid crystal panel 1, the light source 21 and the glasses 4. FIG. 10 illustrates a comparative example with the control processing illustrated in FIG. 9.

As similar to FIG. 9, FIG. 10 illustrates the change in the display image and the change in values of current applied to the respective light sources 21a to 21f with the passage of time, and also illustrates the change in sights opened by the glasses 4 with the passage of time, in the respective regions 1a to 1f of the liquid crystal panel 1.

As illustrated in FIG. 10, conventionally, the signals to be displayed in the respective regions 1a to 1f among the signal (left-eye or right-eye signal) or the black signal included in each image frame are displayed in the respective regions 1a to 1f with predetermined time lags in an order of the first region 1a, the second region 1b, . . . , and the sixth region 1f.

Further, conventionally, the left-eye shutter L is opened and the right-eye shutter R is closed, during a period from a time point when the displaying of the black signal in the right-eye frame in the sixth region 1f where the 6-th image is displayed is started to a time point when the displaying of the signal (image signal) in the next left-eye frame in the sixth region 1f is ended. Alternately, the right-eye shutter R is opened and the left-eye shutter L is closed, during a period from a time point when the displaying of the black signal in the left-eye frame in the sixth region 1f is started to a time point when the displaying of the signal (image signal) in the next right-eye frame in the sixth region 1f is ended.

Further, similar to the example illustrated in FIG. 9, the light sources 21a to 21f are turned on when a predetermined time t has elapsed after displaying of the right-eye or left-eye signal (image signal) in the respective regions 1a to 1f corresponding thereto is started, and are turned off when displaying of the black signal in the respective regions 1a to 1f corresponding thereto is started.

When configuring as described above, the user also views the left-eye image by the left eye and the right-eye image by the right eye, and therefore, it is possible to enjoy the three-dimensional image.

By the above-described configuration, conventionally, when the left-eye or right-eye signal (image signal) is displayed in the first region 1a, a part of the light from the light sources 21b and 21c as well as the light source 21a enters in the first region 1a. Similarly, in each of the second region 1b to sixth region 1f, a part or all of the light from the light sources 21a to 21f other than the light sources 21b to 21f corresponding to each region 1b to 1f enter. Thereby, the effect due to the light being entered from the light sources 21a to 21f other than light sources 21a to 21f corresponding to the respective regions 1a to 1f is increased in an order of the first region 1a, the second region 1b, . . . , and the sixth region 1f. Therefore, conventionally, luminance at the lower portion of the screen (sixth region 1f) is maximized, and the luminance at the center of the screen is smaller than the luminance at the lower portion of the screen.

The impression of a deterioration in the display performance given to the user by a decrease in luminance occurring at the center of the screen is larger than that of by a decrease in luminance occurring at the end portion (lower portion) of the screen. In addition, luminance distribution in which the luminance is decreased from the center of the screen toward the end portions (upper and lower end portions) of the screen can give the impression of natural luminance distribution to the user. Accordingly, as described in Embodiment 2, by controlling so as to maximize the luminance at the center of the screen, the luminance at the lower portion of the screen is more decreased than ever before, however it is possible to improve the impression in the display performance given to the user. Embodiment 2 has a configuration in which the black signal is inserted between the left-eye and right-eye signals (image signals) which follow in time sequence, thereby it is possible to achieve the pseudo impulse type display control, and suppress the occurrence of the crosstalk. In this configuration, by controlling so as to maximize the luminance at the center of the screen, even when the light from the respective light sources 21a to 21f is leaked to the regions 1a to 1f other than the regions 1a to 1f corresponding thereto, it is possible to achieve the natural luminance distribution. Thereby, it is possible to more improve the display quality of the liquid crystal panel 1 as a whole, and provide high display quality than ever before.

Embodiment 3

Hereinafter, a television receiver according to Embodiment 3 will be described. The television receiver of Embodiment 3 has the same configuration as the above-described television receiver of Embodiment 2, and the same units of the configuration thereof will be denoted by the same reference numerals, and will not be described.

The television receiver of Embodiment 2 has a configuration in which the left-eye and right-eye signals (images) are alternately displayed on the liquid crystal panel 1, and the sight of the left eye or the right eye are alternately opened and closed by the glasses 4, thereby achieving the display of a three-dimensional image. Compared with this, the television receiver of Embodiment 3 has a configuration for performing the display of a two-dimensional image.

Specifically, in Embodiment 3, the image signal sent from the image processing unit 54 includes 30 image frames per 1 second, for example. In addition, the image display unit 55 of Embodiment 3 controls the panel driving circuit 56 and the light source driving circuit 57 based on each frame included in signals generated by inserting (replacing) the black signal generated by the black signal generation unit 59 into the image signal acquired from the image processing unit 54. Thereby, the image display unit 55 executes the image display control for the liquid crystal panel 1 and the driving control for the light source 21, and executes the display of the two-dimensional image. Further, the television receiver of Embodiment 3 does not need to include the glasses 4 and the glasses control unit 58.

Figure 11:
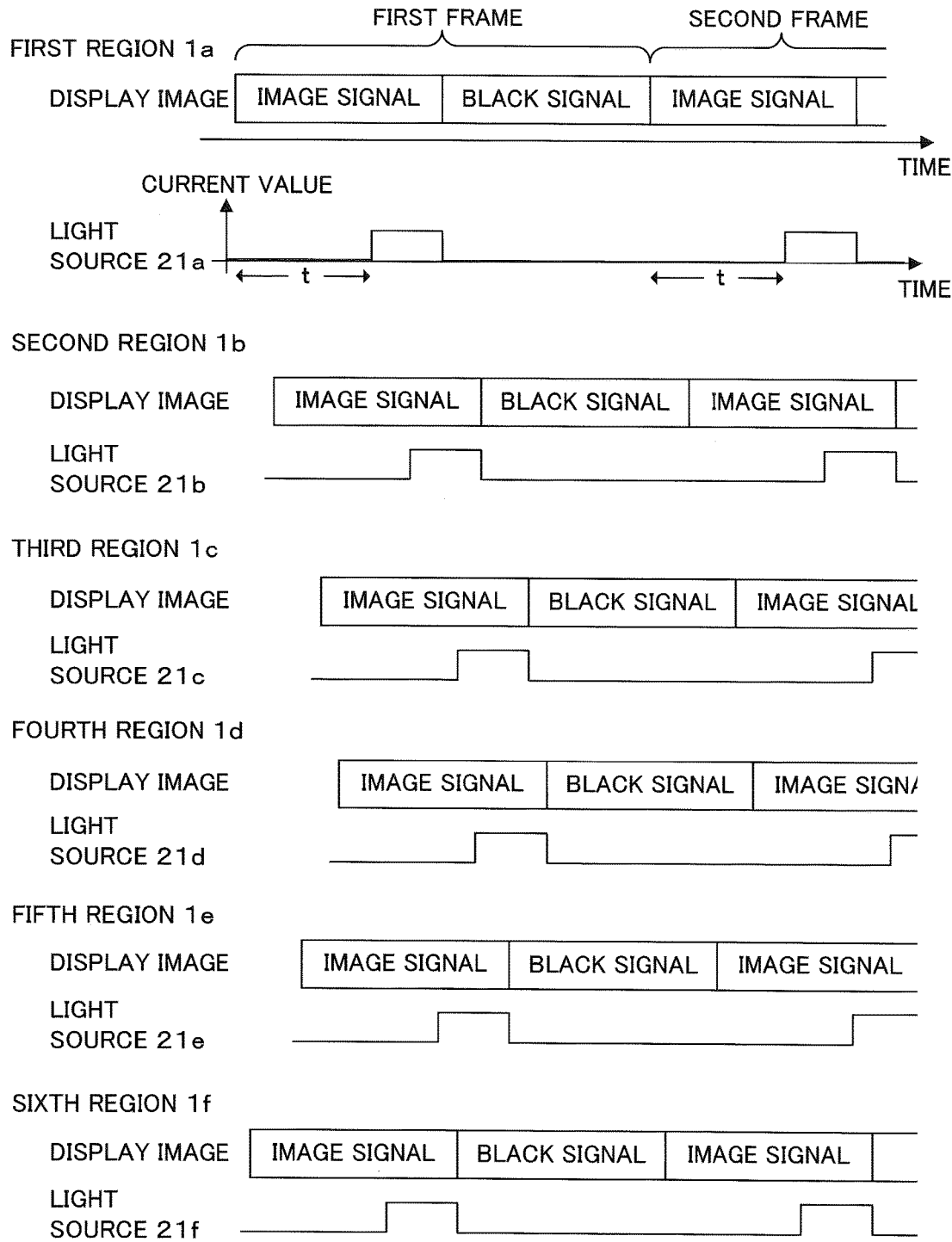
FIG. 11 is a view for describing the control processing for a liquid crystal panel and a light sources according to Embodiment 3.

FIG. 11 is a view for describing the control processing for the liquid crystal panel 1 and the light source 21 according to Embodiment 3. Similarly to FIG. 9, FIG. 11 illustrates the change in the display image and the change in the values of current applied to the respective light sources 21a to 21f with the passage of time, in the respective regions 1a to 1f of the liquid crystal panel 1.

As illustrated in FIG. 11, the panel driving circuit 56 of Embodiment 3 displays the signals to be displayed in the respective regions 1a to 1f among the image signals and the black signals included in each frame, in the respective regions 1a to 1f, with predetermined time lags in an order of the first region 1a, the sixth region 1f, the second region 1b, the fifth region 1e, the third region 1c and the fourth region 1d.

Similar to the above-described Embodiment 2, the light source driving circuit 57 of Embodiment 3 turns on the respective light sources 21a to 21f corresponding to the respective regions 1a to 1f, during a period from a time point when a predetermined time t has elapsed since the displaying of the image signals in the respective regions 1f to 1a is started to a time point when the displaying of the next black signal in the respective regions 1f to 1a is started. By the above-described configuration, the user can view the two-dimensional image and enjoy it.

When configuring as described above, similar to the configuration described in the above Embodiment 2, the light from the respective light sources 21a to 21f enters into the regions 1a to 1f other than the regions 1a to 1f corresponding thereto, such that the luminance at the center (fourth region 1d) of the screen is more increased than that of the upper and lower end portion of the screen. In this way, by controlling so as to maximize the luminance at the center of the screen, it is possible to reduce the impression of a deterioration in the display performance given to the user, and thereby, the display quality of the liquid crystal panel 1 may be improved as a whole.

Figure 12:
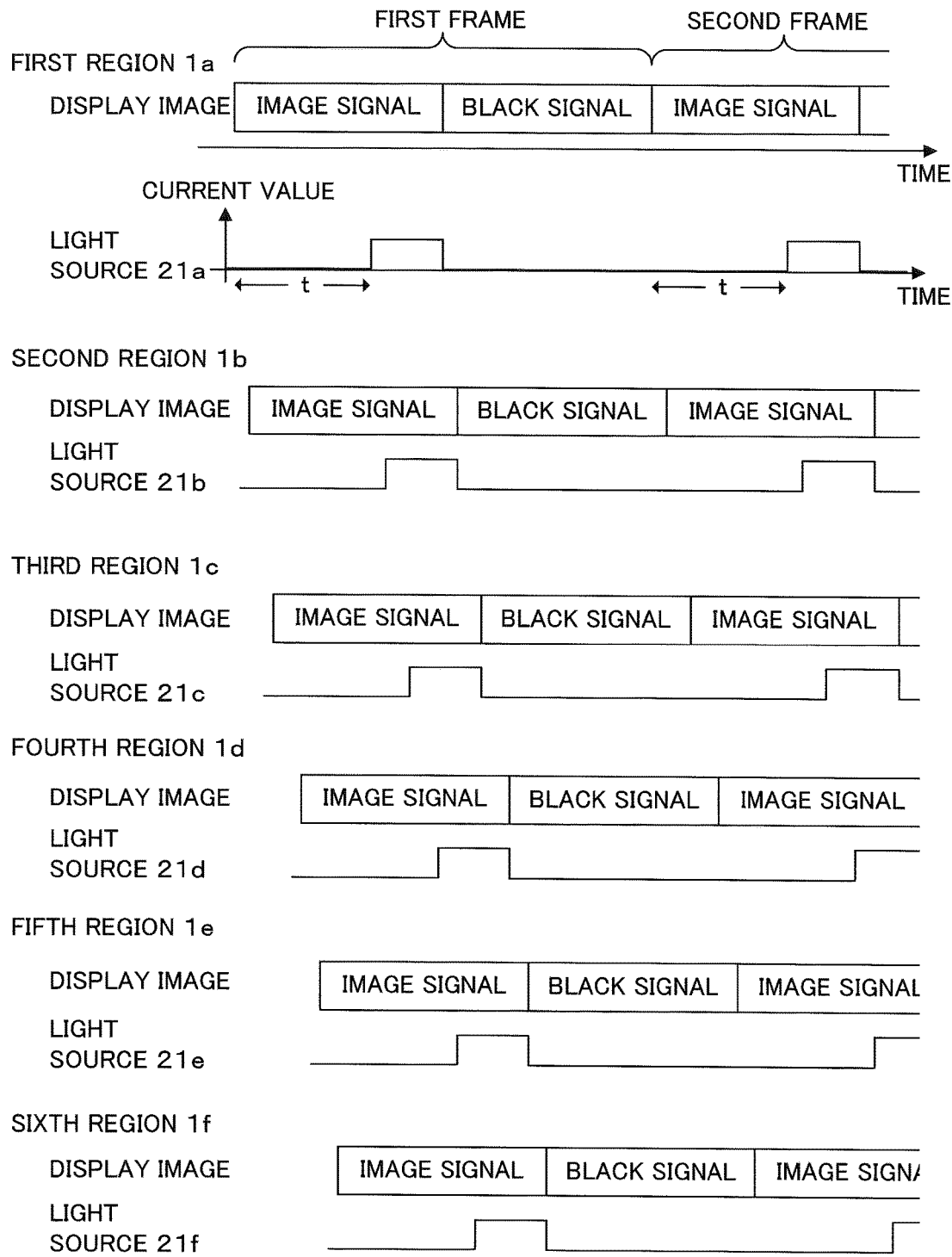
FIG. 12 is a view for describing conventional control processing for the liquid crystal panel and the light source.

FIG. 12 is a view for describing the conventional control processing for the liquid crystal panel 1 and the light source 21. FIG. 12 illustrates a comparative example with the control processing illustrated in FIG. 11. Similarly to FIG. 11, FIG. 12 illustrates the change in the display image and the change in the values of current applied to the respective light sources 21a to 21f with the passage of time, in the respective regions 1a to 1f of the liquid crystal panel 1.

As illustrated in FIG. 12, conventionally, the signal to be displayed in the respective regions 1a to 1f among the image signal or the black signal included in each image frame is displayed in the respective regions 1a to 1f with predetermined time lags in an order of the first region 1a, the second region 1b, . . . , and the sixth region 1f. Further, similar to the example illustrated in FIG. 11, the light sources 21a to 21f are turned on when a predetermined time t has elapsed after displaying of the image signal in the respective regions 1a to 1f corresponding thereto is started, and are turned off when displaying of the black signal in the respective regions 1a to 1f corresponding thereto is started.

By the above-described configuration, similar to the example illustrated in FIG. 10 according to Embodiment 2, conventionally, the light from the respective light sources 21a to 21f enters into the regions 1a to 1f other than the regions 1a to 1f corresponding thereto, such that the luminance at the lower portion of the screen (sixth region 1f) is maximized. Accordingly, the luminance at the center of the screen is smaller than the luminance at the lower portion of the screen, thereby giving the impression of a deterioration in the display performance to the user.

However, in Embodiment 3, by controlling so as to maximize the luminance at the center of the screen, the luminance at the lower portion of the screen is more decreased than ever before, however it is possible to give the impression of natural luminance distribution to the user, and thereby the impression in the display performance given to the user can be improved. Thereby, even when the light from the respective light sources 21a to 21f is leaked to the regions 1a to 1f other than the regions 1a to 1f corresponding thereto, it is possible to more improve the display quality of the liquid crystal panel 1 as a whole, and provide high display quality than ever before.

Embodiment 4

Hereinafter, a television receiver according to Embodiment 4 will be described. Only the configuration of the light source unit of the television receiver of Embodiment 4 is different from that of the television receivers of the above-described Embodiments 1 to 3, and other configuration is the same as the above-described Embodiments 1 to 3. In addition, in the television receiver of Embodiment 4, various processing such as the control processing for the liquid crystal panel 1 by the panel driving circuit 56, the driving processing for the light source 21 by the light source driving circuit 57 and the opening and closing control processing for the shutter L and R of the glasses 4 by the glasses control unit 58 are the same as the processing in the above-described Embodiments 1 to 3.

The television receivers according to Embodiments 1 to 3 are the light guide type (edge light type and side edge type) liquid crystal displays in which the light source unit 2 irradiates the liquid crystal panel 1 with light through the light guide plate 3. The display apparatus of the present invention is not limited thereto, and may be applied to a direct type liquid crystal display in which the liquid crystal panel 1 is directly irradiated with light from the backlight (light source) disposed on the back surface side of the liquid crystal panel 1.

Figure 13A:
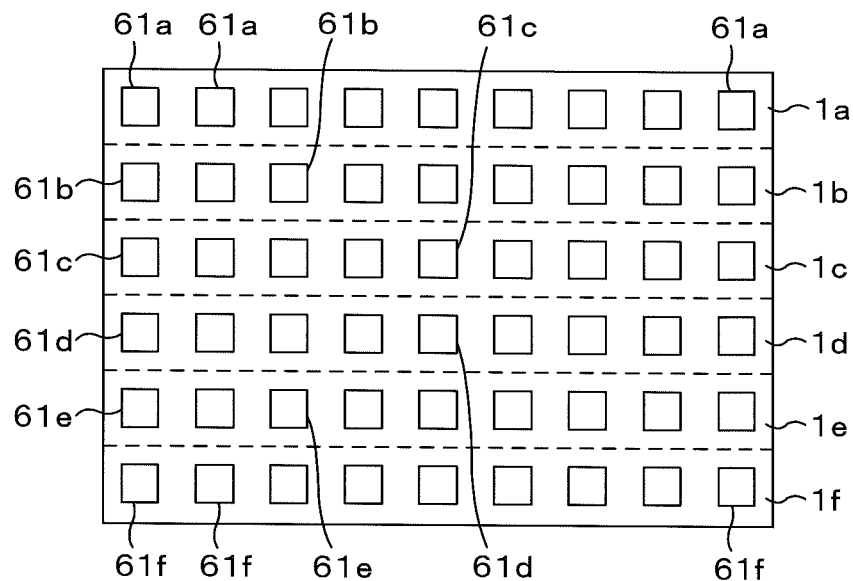
FIG. 13A is a schematic view illustrating a relationship between a liquid crystal panel and a light source according to Embodiment 4.
Figure 13B:
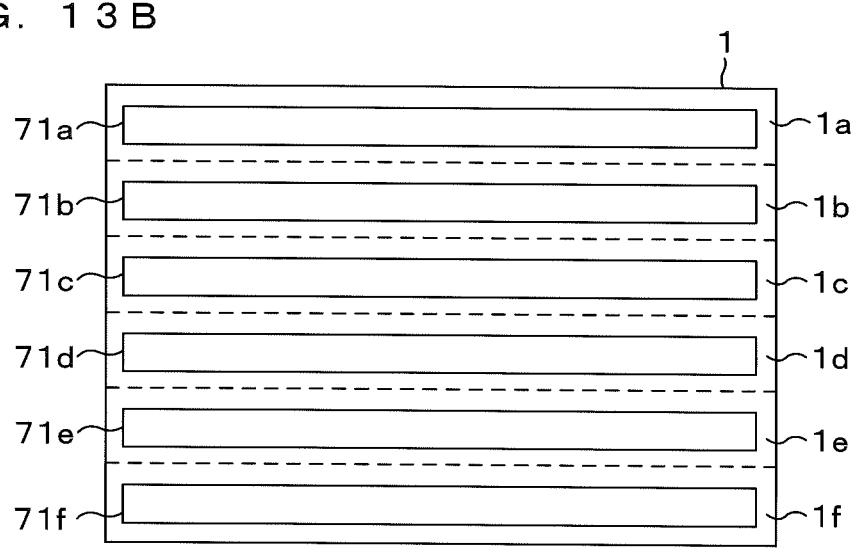
FIG. 13B is a schematic view illustrating a relationship between a liquid crystal panel and a light source according to Embodiment 4.

FIGS. 13A and 13B are schematic views illustrating a relationship between the liquid crystal panel 1 and the light source according to Embodiment 4. FIG. 13A illustrates, as an example of Embodiment 4, a relationship between respective regions 1a to 1f of the liquid crystal panel 1 and light sources 61a to 61f using a light emitting diode (LED), for example. In the example illustrated in FIG. 13A, the light sources 61a to 61f respectively include nine light sources disposed so as to face the back surfaces of the respective regions 1a to 1f of the liquid crystal panel 1. In this configuration, the first region 1a of the liquid crystal panel 1 is irradiated with light from the nine light sources 61a, the second region 1b of the liquid crystal panel 1 is irradiated with light from the nine light sources 61b, the third region 1c of the liquid crystal panel 1 is irradiated with light from the nine light sources 61c, the fourth region 1d of the liquid crystal panel 1 is irradiated with light from the nine light sources 61d, the fifth region 1e of the liquid crystal panel 1 is irradiated with light from the nine light sources 61e, and the sixth region 1f of the liquid crystal panel 1 is irradiated with light from the nine light sources 61f. In this configuration, the same driving control is performed on the respective nine light sources of the light sources 61a to 61f, but each different driving control is performed on each of the light sources 61a to 61f.

FIG. 13B illustrates a relationship between the respective regions 1a to 1f of the liquid crystal panel 1 and light sources 71a to 71f using a cold cathode fluorescent lamp (CCFL), for example. In the example illustrated in FIG. 13B, the light sources 71a to 71f are respectively disposed so as to face the back surfaces of the respective regions 1a to 1f of the liquid crystal panel 1. In this configuration, each different driving control is performed on each of the light sources 71a to 71f, and the each of the first region 1a to the sixth region 1f of the liquid crystal panel 1 is irradiated with light from the respective light sources 71a to 71f.

Also, in the direct type liquid crystal display illustrated in FIGS. 13A and 13B, various processing described in the above Embodiments 1 to 3 can be executed. Further, also in the direct type liquid crystal display illustrated in FIGS. 13A and 13B, a problem in which the light from the respective light sources enters into the region other than the regions corresponding thereto occurs. Thereby, also in the television receiver according to Embodiment 4, the control processing for the liquid crystal panel 1, the driving processing for the light sources 61a to 61f (or 71a to 71f) and the control processing for the shutters L and R of the glasses 4 illustrated in the above-described Embodiments 1 to 3 are performed. Therefore, it is possible to reduce the occurrence of the crosstalk in the center of the liquid crystal panel 1, and maximize the luminance at the center of the screen, and thereby the impression in the display performance given to the user may be improved. As a result, it is possible to more improve the display quality of the liquid crystal panel 1 as a whole, and provide high display quality than ever before.

In the above-described Embodiments 1 to 4, the display region of the liquid crystal panel 1 is divided into six regions in the vertical direction, and the display control of the image is performed for each region 1a to 1f, and the driving control is performed for each light source 21a to 21f (or 61a to 61f or 71a to 71f) corresponding to the respective regions 1a to 1f. In addition thereto, the display region of the liquid crystal panel 1 may be divided into six regions in the lateral direction, and the display control of the image may be performed for each region, and the driving control may also be performed for each light source corresponding to each region. In addition, the display region of the liquid crystal panel 1 is not limited to the configuration of dividing into six regions, and it may be divided into four to eight regions. In this case, it may be configured in such a manner that the light sources as much as the number of the divided regions are provided, and the respective divided regions are irradiated with light by the respective light sources. Further, the display control of the image may be performed for each divided region, and the driving control may be performed for each light source corresponding to the respective regions.

In the above-described Embodiments 1 to 4, the examples in which the display apparatus and the display system according to the present invention are applied to the television receiver has been described. In addition thereto, the display apparatus and the display system of the present invention may be applied to a digital photo frame which displays an image on the display panel based on image data imaged by an imaging apparatus or image data received through a network, a digital signage which displays an image on the display panel based on data previously stored in an internal memory or data received through the network, and the like.

As this description may be embodied in several forms without departing from the spirit of essential characteristics thereof, the present embodiments are therefore illustrative and not restrictive, since the scope is defined by the appended claims rather than by the description preceding them, and all changes that fall within metes and bounds of the claims, or equivalence of such metes and bounds thereof are therefore intended to be embraced by the claims. In addition, technical features described in each embodiment may be combined with each other, and new technical features may be formed by the combination.

The invention claimed is:

1. A display apparatus comprising:
a liquid crystal panel which displays an image signal including a plurality of image frames, a display region of the liquid crystal panel being divided into n (n≥3) sub-regions which are juxtaposed in a predetermined direction;
n light sources which are juxtaposed in the predetermined direction, and provided so as to irradiate the corresponding n sub-regions of the liquid crystal panel with light, respectively;
a display control unit which displays a signal corresponding to a sub-region of interest, on the sub-region of interest,
wherein the n sub-regions comprise:
 (i) a sub-region $R_1$ which is one of either end of the predetermined direction;
 (ii) a sub-region $R_2$ which is the other of either end of the predetermined direction; and
 (iii) sub-regions $R_m$ to $R_n$ between the sub-region $R_1$ and the sub-region $R_2$ wherein (3≤m≤n); and
a light source control unit for causing each of the n light sources corresponding to a selected sub-region to irradiate the selected sub-region with light after a predetermined time and during only a latter period within a period in which the display control unit displays the signal on the selected sub-region of the liquid crystal panel, wherein the display apparatus comprises only the n light sources, and the period corresponds to a time when the display control unit starts displaying the signal for an image frame to when the display control unit starts displaying the signal for a next image frame,
wherein the sub-region of interest is selected sequentially one by one from the n sub-regions,
wherein:
the sub-region $R_1$ is first selected as the sub-region of interest;
the sub-region $R_2$ is selected as the next sub-region of interest; and
the sub-regions $R_m$ to $R_n$ are selected sequentially one by one according to the following formulas:
 (a) wherein in the case where m is odd, m=2t−1 (t≥2) and the sub-region $R_m$ is the t-th sub-region counted from the sub-region $R_1$; and
 (b) wherein in the case where m is even, m=2t (t≥2) and the sub-region $R_m$ is the t-th sub-region counted from the sub-region $R_2$,
such that the n sub-regions are selected, and
wherein the display control unit alternately displays a signal corresponding to the selected sub-region in an image frame for left eye and a signal corresponding to the selected sub-region in an image frame for right eye, in the selected sub-region of the liquid crystal panel.

2. The display apparatus according to claim 1, comprising a black insertion unit which inserts black signals into the image signal to generate a black signal-inserted image signal during at least a part of a period of displaying each of the plurality of image frames included in the image signal,
wherein the display control unit displays a signal corresponding to the selected sub-region included in the black signal-inserted image signal on the selected sub-region of the liquid crystal panel.

3. The display apparatus according to claim 1, wherein the light source control unit causes the one of the n light sources corresponding to the selected sub-region to irradiate the selected sub-region with light during a period from a time point when a predetermined time has elapsed since the display control unit started displaying a signal corresponding to the selected sub-region to a time point when the display control unit starts displaying a signal in the next image frame on the selected sub-region.

4. The display apparatus according to claim 2, wherein the light source control unit causes the one of the n light sources corresponding to the selected sub-region to irradiate the selected sub-region with light, during only a latter period within a period in which the display control unit displays a signal corresponding to the selected sub-region other than the black signals inserted by the black insertion unit on the selected sub-region of the liquid crystal panel.

5. A display system, comprising:
the display apparatus according to claim 1;
a glasses having a left-eye region and a right-eye region which are controlled passing/blocking of light, respectively; and
a glasses control unit which respectively controls the passing/blocking of light in the left-eye region and the right-eye region of the glasses, in accordance with an image frame to be displayed on the selected sub-region of the liquid crystal panel by the display control unit of the display apparatus.

6. A display system, comprising:
the display apparatus according to claim 2;
a glasses having a left-eye region and a right-eye region which are controlled passing/blocking of light, respectively; and
a glasses control unit which respectively controls the passing/blocking of light in the left-eye region and the right-eye region of the glasses, in accordance with an image frame to be displayed on the selected sub-region of the liquid crystal panel by the display control unit of the display apparatus.

7. The display system according to claim 6, wherein the glasses control unit is configured to pass light to the left-eye region and block light to the right-eye region during a period from a time point when the black insertion unit starts displaying the black signal in the image frame for the right eye to a time point when the display control unit stops displaying a signal in the next image frame for the left eye.

8. The display system according to claim 6, wherein the glasses control unit is configured to pass light to the right-eye region and block light to the left-eye region during a period from a time point when the black insertion unit starts displaying the black signal in the image frame for the left eye to a time point when the display control unit stops displaying a signal in the next image frame for the right eye.

9. The display apparatus according to claim 1, wherein the light source control unit is configured to apply a current to one of the n light sources corresponding to a selected sub-region to irradiate the selected sub-region with light during only a latter period within a period in which the display control unit displays the signal on the selected sub-region of the liquid crystal panel.

10. The display apparatus according to claim 2, wherein the light source control unit is configured to apply a current to one of the n light sources corresponding to the selected sub-region to irradiate the selected sub-region with light, during only a latter period within a period in which the display control nit displays a signal corresponding to the selected sub-region other than the black signals inserted b the black insertion unit on the selected sub-region of the liquid crystal panel.

* * * * *